(12) United States Patent
Shiraishi

(10) Patent No.: US 8,031,986 B2
(45) Date of Patent: Oct. 4, 2011

(54) OPTICAL CONTROL DEVICE

(75) Inventor: Takashi Shiraishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 130 days.

(21) Appl. No.: 12/555,404

(22) Filed: Sep. 8, 2009

(65) Prior Publication Data

US 2010/0027935 A1 Feb. 4, 2010

Related U.S. Application Data

(63) Continuation of application No. PCT/JP2007/056423, filed on Mar. 27, 2007.

(51) Int. Cl.
*G02F 1/035* (2006.01)
*G02F 1/1335* (2006.01)
*G02F 1/295* (2006.01)
*G02B 6/12* (2006.01)

(52) U.S. Cl. .............. 385/2; 385/8; 385/14; 349/112

(58) Field of Classification Search ........... 385/2–9, 385/14–16, 147, 39, 40; 349/112
See application file for complete search history.

(56) References Cited

U.S. PATENT DOCUMENTS

| | | | |
|---|---|---|---|
| 5,982,958 A | 11/1999 | Minowa et al. | |
| 7,035,488 B2 | 4/2006 | Sugamata et al. | |
| 7,058,241 B2 * | 6/2006 | Sugiyama et al. | 385/4 |
| 7,095,926 B2 | 8/2006 | Sugiyama | |
| 7,155,072 B2 * | 12/2006 | Sugiyama et al. | 385/2 |
| 7,953,305 B2 * | 5/2011 | Sugiyama | 385/14 |
| 2003/0007711 A1 | 1/2003 | Sugamata et al. | |
| 2003/0031400 A1 * | 2/2003 | Pruneri | 385/14 |
| 2005/0157970 A1 | 7/2005 | Sugamata et al. | |
| 2005/0201686 A1 * | 9/2005 | Cole et al. | 385/40 |
| 2006/0056766 A1 | 3/2006 | Sugiyama | |
| 2006/0140530 A1 * | 6/2006 | Kim et al. | 385/8 |

FOREIGN PATENT DOCUMENTS

| | | |
|---|---|---|
| JP | 5-78016 | 10/1993 |
| JP | 6-75196 | 3/1994 |
| JP | 10-206810 | 8/1998 |
| JP | 2873203 | 1/1999 |
| JP | 2001-255501 | 9/2001 |
| JP | 2002-122834 | 4/2002 |
| JP | 2003-66393 | 3/2003 |
| JP | 2006-84537 | 3/2006 |
| JP | 2006-284963 | 10/2006 |

OTHER PUBLICATIONS

M. Doi, et al., "Optical Frequency Comb Generation Using LiNbO₃ Integrated Modulator," IEICE, 2004.

* cited by examiner

*Primary Examiner* — Akm Ullah
(74) *Attorney, Agent, or Firm* — Fujitsu Patent Center

(57) ABSTRACT

The optical device includes a substrate having an electrooptic effect; a plurality of optical waveguides formed in the substrate in parallel to one another; and a polarization inversion region which is disposed a part of the substrate and which has a polarization characteristic that is an inverse to that of the substrate, wherein a profile of a boundary between the polarization inversion region and a remaining region in which the polarization is not inverted is configured such that accumulated amounts of distortion that affects the respective waveguides over coordinates along a light propagation direction are substantially identical.

19 Claims, 27 Drawing Sheets

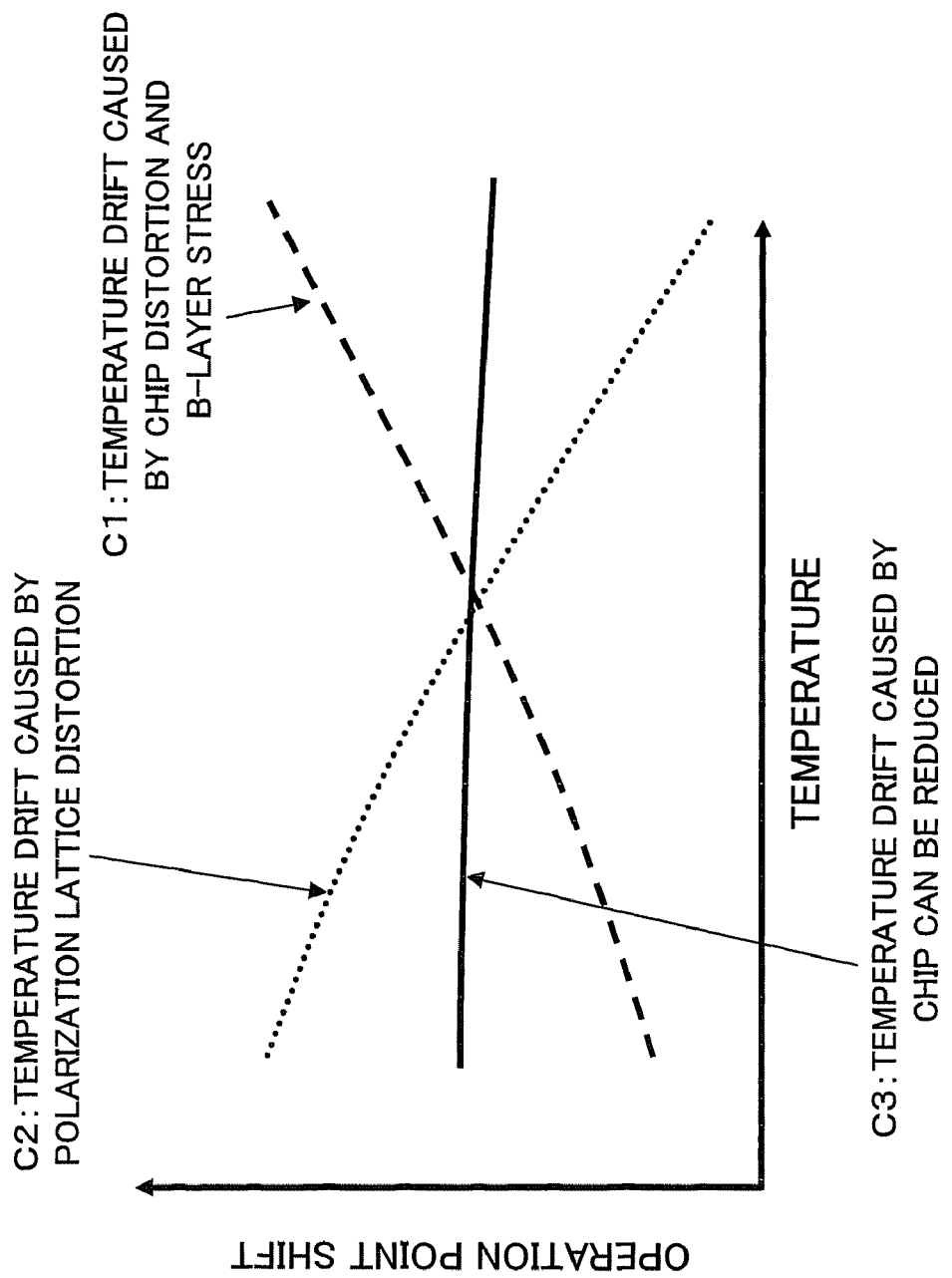

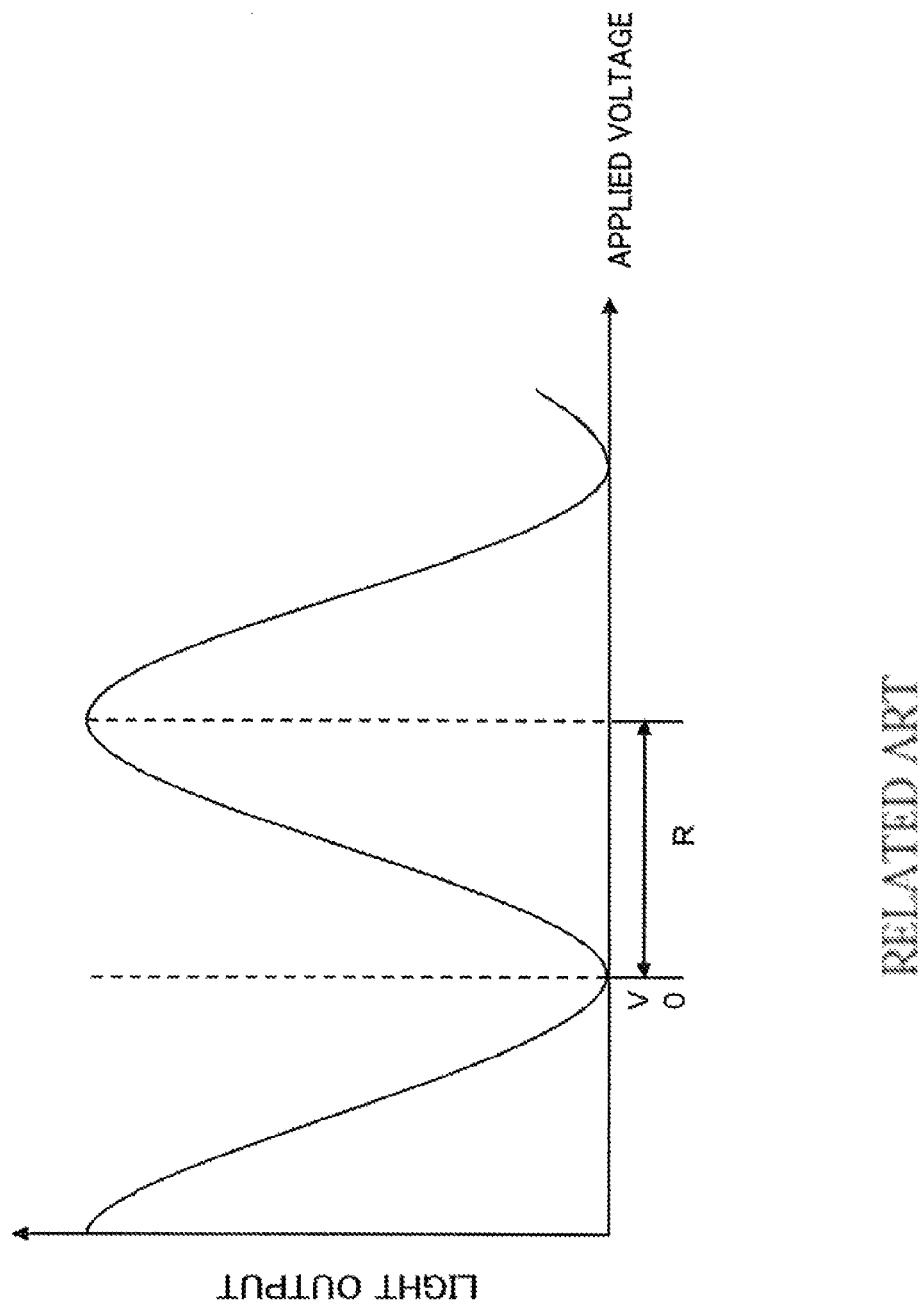

OPTICAL CONTROL DEVICE

CROSS-REFERENCE TO RELATED APPLICATION

This application is a continuation Application of a PCT international application No. PCT/JP2007/056423 filed on Mar. 27, 2007 in Japan, the entire contents of which are incorporated by reference.

FIELD

The embodiments disclosed herein relate to an optical device preferably used in an optical communication system.

BACKGROUND

An optical waveguide device using electro-optic crystal, such as a substrate made of lithium niobate ($LiNbO_3$) or $LiTaO_3$, is fabricated by forming an optical waveguide through depositing a metal layer on the crystalline substrate and thermal diffusing the metal layer or through proton exchange in benzoic acid after patterning, and then forming an electrode in the vicinity of the optical waveguide.

Forming an electrode in electro-optic crystal in which such an optical waveguide is formed to provide light propagating through the optical waveguide with a variation in refractive index, the electro-optic crystal is configured to serve as an optical device that performs optical modulation. Further, in the optical device equipped with such an electrode, an insulating layer, such as $SiO_2$ buffer layer is interposed between the electrode and the substrate in order to avoid light absorption by the electrode.

The electro-optic modulator made from a ferroelectric material such as lithium niobate ($LiNbO_3$) has already been put into practice in the field of an optical communication system and others. In addition, a high-speed optical modulator is being put into market which is capable of modulating with a high-frequency electric signal as high as 40 GHz.

FIG. 23 is a top view of a normal optical device used as the above optical modulator, and FIG. 24 is an AA' sectional view of the optical device 100 of FIG. 23. In the optical device 100 of FIGS. 23 and 24, a Mach-Zehnder optical waveguide 102 serving as a Mach-Zehnder interferometer (MZI) is formed on a Z-cut substrate (hereinafter simply called LN substrate) 101 formed from lithium niobate, and a signal electrode 104 and a grounding electrode 105 are also formed via a buffer layer 103. The Mach-Zehnder optical waveguide 102 includes two branch waveguides 102b-1 and 102b-2 and Y-shaped waveguides 102a and 102c that are coupled to the edges to the two branch waveguides 102b-1 and 102b-2 and that respectively splits and couples propagating light.

The signal electrode 104 is formed so as to include the superior region of one of the two branch waveguides 102b-1 and 102b-2, and the grounding electrode 105 is formed so as to enclose the signal electrode 104 on the substrate 101, keeping a predetermined distance from the signal electrode 104. In addition, application of a voltage from the signal electrode 104, for example, shifts the phase difference between light components propagating through the branch waveguides 102b-1 and 102b-2, so that an optical signal, the intensity of which is on-off modulated is output from the Y-shaped waveguide 102c serving as a coupling waveguide.

FIG. 27 is a diagram depicting a variation (an optical modulation intensity curve) in optical output level with a voltage applied to the signal electrode 104. As depicted in FIG. 27, the level of the optical output varies with the applied voltage to draw a sine wave. For example, under the previous setting of the operation point voltage to be V0, optical modulation can be accomplished by varying an applied voltage in the range of R in the drawing through the use of the operation point as a reference.

The optical device 100 serving as such an optical modulator is known for influence of a phenomenon called temperature drift that the operation point voltage varies in accordance with a variation in temperature on modulation characteristics. Here, detailed description will be made in relation to temperature drift. The output light intensity S is represented by the following formula (1) under the assumption that the optical device illustrated in FIG. 23 has a configuration in which the Y-shaped waveguides 102a and 102c are 3 dB splitting couplers and light is not lost in the propagation process of the Mach-Zehnder optical waveguide 102.

$$S = S_0 \cos^2\left(\frac{\phi_2 - \phi_1}{2}\right) \quad (1)$$

where, the symbols $\phi_2$ and $\phi_1$ represent the phase shifts that light undergoes while propagating through the branch waveguides 102b-1 and 102b-2, respectively, and are each represented by formula (2).

$$\phi = (n_0 + \Delta n)L = \left(n_0 - \frac{n_0^3}{2}rE\right)L \quad (2)$$

Where, $n_0$ represents the refractive index of the substrate, r represents an electro-optic coefficient, E represents the intensity of an electric field applied to the waveguide and is proportional to a voltage applied to the electrode, and L represents the length of interaction between the electrode and the waveguide. In other words, the light intensity varies with the difference in refractive index between the two waveguides 102b-1 and 102b-2 in the optical device 100 serving as an MZI optical modulator, as illustrated in FIG. 23. As described above, an optical modulator sets a predetermined operation point on a certain light intensity curve in advance and carries out optical modulation using the operation point as a reference. Here, assuming that temperature generates a difference in refractive index between the two waveguides 102b-1 and 102b-2, the light intensity can be expressed in formula (3) in which the voltage to shift to a predetermined operation point and the modulating voltage are respectively represented by Vb and Vs.

$$S = S_0 \cos^2(A(Vb+Vs) + B\Delta n(T)) \quad (3)$$

Where, the symbols A and B are constants of proportion; $\Delta n(T)$ represents a difference in refractive index between the two branch waveguides 102b-1 and 102b-2 caused by temperature. Vb usually represents a DC voltage, and Vs represents a high-speed RF signal used for driving the modulator. Generation of $\Delta n(T)$ due to temperature means deviation of the operation point set by Vb. Therefore, temperature drift means deviation of the operation point due to a variation in temperature and one of the reasons of temperature drift is appearance of a difference in refractive index between branch waveguides 102b-1 and 102b-2 which difference depends on temperature.

The major causes of occurrence of temperature drift are first major cause due to an asymmetric voltage which is caused by charge generated in accordance with temperature when the substrate is formed of a material having a pyroelectric effect exemplified by LiNbO$_3$ and which affects two waveguides, and the second major cause due to a stress caused by a difference in the thermal expansion coefficient between the electrode and the substrate.

The following Patent References 1 and 2 disclose techniques to resolve temperature drift caused by the above first major cause. Specifically, forming a layer contacting to the electrodes makes the charge symmetric, so that electric fields penetrating the optical waveguides are equalized, which electric fields are generated by charge occurring the substrate material in response to a variation in temperature.

In addition, Patent References 3-5 below disclose techniques to resolve temperature drift caused by the above second major cause. In order to ensure a high-speed operation, the electrode of an optical modulator needs to be as high as several dozen μm, which generates a large stress due to a difference in thermal expansion coefficient between the electrode and the substrate to cause temperature drift. The techniques disclosed in Patent References 3-5 form two optical waveguides constituting the MZI relative to the electrode configuration to be symmetric as much as possible in attempt of reducing temperature drift caused by the stress.

[Patent Reference 1] Japanese Examined Patent Application Publication No. HEI 5-78016
[Patent Reference 2] Japanese Patent No. 2873203
[Patent Reference 3] Japanese Patent Application Publication No. 2001-255501
[Patent Reference 4] Japanese Patent Application Publication No. 2002-122834
[Patent Reference 5] Japanese Patent Application Publication No. 2006-84537

However, in a circumstance where an optical waveguide needs to be formed so as to be deviated toward one side of the substrate 101 like the optical waveguide 102' constituting the MZI of FIG. 25, a stress S caused by chip distortion due to temperature (distortion caused by warp of the substrate 101) or a difference in thermal expansion coefficient between the buffer layer 103 and the substrate 101 applies different stresses to the two optical waveguides 102b-1 and 102b-2 and thereby generates temperature drift.

For example, when two optical modulators are concurrently formed on a signal substrate (i.e., a single chip) as disclosed in a reference of "Masaharu DOI et al., the institute of communication, spring of the year 2004, C-4-43", the optical modulators are deviated toward respective sides of the substrate. The techniques of the Patent References 1-5 have difficulties in compensating temperature drift occurring in the above case.

FIG. 26 is an AA' sectional view of FIG. 25. A stress generated by a variation in temperature of the substrate 101 illustrated in FIG. 25 is schematically along the direction S in FIG. 26, for example. Since a waveguide closer to either chip edges (either edge in the width direction of the substrate 101) is affected by a larger stress, the branch waveguide 102b-1 closer to the chip edge is affected by a relatively larger stress than that affects the branch waveguide 102b-2. The difference of stress affecting the waveguides results in asymmetric variation in refractive index, which causes temperature drift.

SUMMARY (1) According to an aspect of the embodiment, there is provided an optical device including: a substrate having an electrooptic effect; a plurality of optical waveguides formed in the substrate in parallel to one another; and a polarization inversion region which is formed on a part of the substrate and has a polarization characteristic that is an inverse to that of the substrate, wherein a profile of a boundary between the polarization inversion region and a remaining region in which the polarization is not inverted is configured such that accumulated amounts of distortion that affects the respective waveguides over coordinates along a light propagation direction are substantially identical.

(2) According to another aspect of the embodiment, there is provided an optical device including a substrate having an electrooptic effect; a plurality of optical waveguides formed in the substrate in parallel to one another; and a polarization inversion region which is disposed on a part of the substrate and has a polarization characteristic that is an inverse to that of the substrate, the polarization inversion region is disposed at a region in which the plurality of optical waveguides is not disposed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram explaining the effects of the first embodiment of the present invention;

FIG. 7 is a diagram schematically illustrating an example of distortion generated on the section of FIG. 7(a) of a substrate being at a low temperature;

FIG. 27 is a drawing explaining a conventional technique;

DESCRIPTION OF EMBODIMENT

Hereinafter, a description will now be made in relation to various embodiments of the present invention with reference to accompanying drawings.

However, it should be noted that the embodiment should by no means be limited to the embodiments below. In addition to the above object of the present invention, the following disclosure reveals technical problems, means to solve the technical problems and effects of the present invention.

(A) First Embodiment

Figure 1:
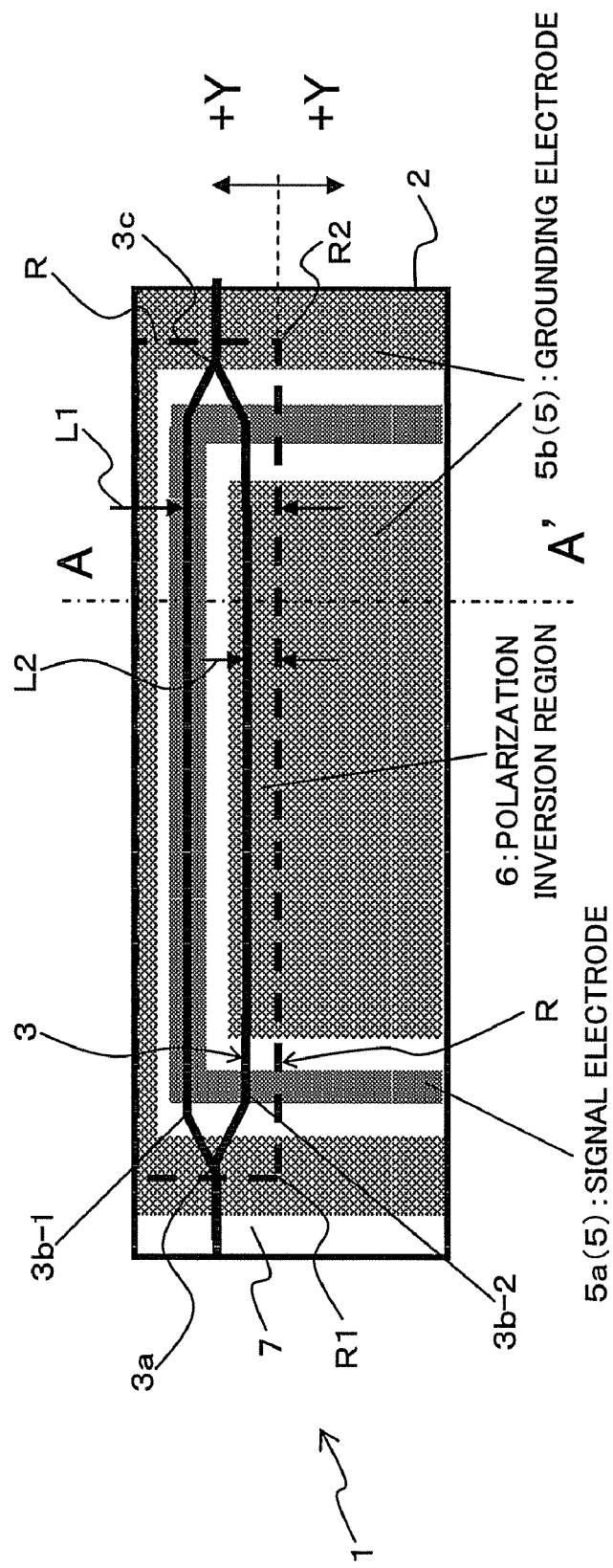
FIG. 1 is a top view schematically illustrating an optical device according to a first embodiment.
Figure 2A:
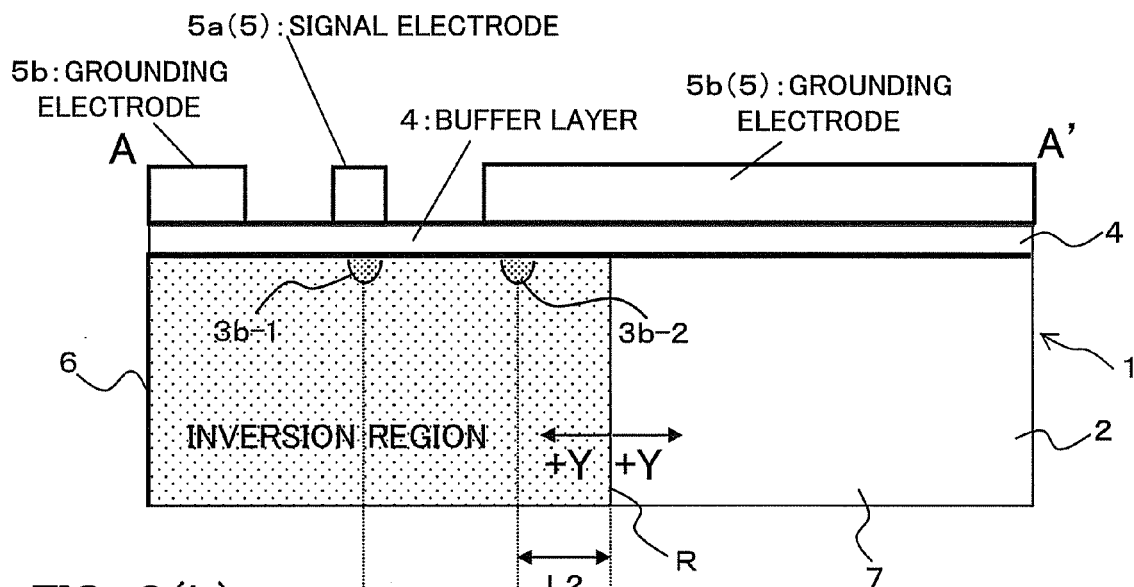
FIG. 2 is a sectional view of an optical device illustrated in FIG. 1.
FIG. 2(b) is a diagram schematically illustrating an example of distortion generated on the section of (a) of a substrate being at a low temperature.

FIG. 1 is a top view schematically illustrating an optical device 1 according to a first embodiment of the present invention; and FIG. 2(a) is a AA' sectional view of the optical device 1 depicted in FIG. 1. The optical device 1 illustrated in FIGS. 1 and 2(a) includes a Z-cut LN substrate 2 serving as an example of a substrate having an electrooptic effect, a Mach-Zehnder optical waveguide 3 formed on the LN substrate 2, and an electrode 5 formed over the LN substrate 2, being interposed by a buffer layer 4 (see FIG. 2(a)).

The Mach-Zehnder optical waveguide 3 is formed so as to be deviated toward one side in the width direction of the LN substrate 2 (the upper region in the drawing), and includes a splitting waveguide 3a that splits input light into a number of light components, a number of branch waveguides (a first branch waveguide 3b-1 and a second branch waveguide 3b-2) that propagate respective light components obtained through splitting in the splitting waveguide 3a, and a coupling waveguide 3c that couples light components from the branch waveguides 3b-1 and 3b-2.

The branch waveguides 3b-1 and 3b-2 are formed to have a light propagation direction in substantially parallel to the X axis or the Y axis of the LN substrate 2 (in this embodiment, the X axis). In addition, the first embodiment has the branch number at the splitting waveguide 3a being two and the number of branch waveguides 3b-1 and 3b-2 being two, which are only examples. In other words, the two branch waveguides 3b-1 and 3b-2 are two optical waveguides arranged in parallel to each other on the LN substrate 2.

Further, the electrode 5 causes the refractive indexes of light components propagating through the two branch waveguides 3b-1 and 3b-2 to have a difference. The electrode 5 includes a signal electrode 5a that is disposed over a portion of the branch waveguide 3b-1, one of the two branch waveguides 3b-1 and 3b-2, and grounding electrodes 5b that are disposed so as to sandwich the signal electrode 5a therebetween, keeping predetermined distances from the signal electrode 5a.

The optical device 1 includes a polarization inversion region 6 which is formed a portion of the LN substrate 2 and at which the polarization of the LN substrate 2 is inverted. The polarization inversion region 6 is represented by a portion enclosed by a dotted line in FIG. 1 and by hatching in FIG. 2(a). As depicted in FIGS. 1 and 2(a), the polarization inversion region 6 of the optical device 1 of the first embodiment contains a portion at which the Mach-Zehnder optical waveguide 3 is formed. In other words, the Mach-Zehnder optical waveguide 3 is formed in the polarization inversion region 6 on the LN substrate 2.

As depicted in FIGS. 1 and 2(a), as the profile of the boundary of the polarization inversion region 6 with the remaining region 7 in which the polarization is not inverted (on the LN substrate 2), the polarization inversion region 6 includes an interface R (see the boundary linear region R1-R2 in FIG. 1) having predetermined distances L1 and L2 respectively from the branch waveguides 3b-1 and 3b-2, which are outermost branch waveguides among a number of branch waveguides arranged in parallel with one another. In other words, the interface R is parallel with the branch waveguides 3b-1 and 3b-2 parallel to each other at respective constant distances. Here, the distance between the branch waveguide 3b-1 and the boundary linear region R1-R2 is L1 and the distance between the branch waveguide 3b-2 and the boundary linear region R1-R2 is L2, which is shorter than L1.

Here, the present inventor has found that forming a polarization inversion region 6 having an inverted polarity to that of the LN substrate 2 along the branch waveguides 3b-1 and 3b-2 causes the lattice distortion generated at the polarization inversion interface (i.e., the interface R) to provide respective different variations depending on temperature to the refractive indexes of the branch waveguides 3b-1 and 3b-2b of the Mach-Zehnder optical waveguide 3 and thereby temperature drift occurs. This is because temperature variation seems to increase or decrease distortion caused by mismatch of lattice in the interface R.

Namely, in cases where the branch waveguides 3b-1 and 3b-2 are formed in parallel to the X axis of the Z-cut LN substrate 2, polarization inversion region 6 and the remaining region 7 that interpose the interface R therebetween have crystal orientations (+Y) opposite to each other in the Y-axis direction which is parallel to the face of the substrate 2 and which is perpendicular to the formation of the branch waveguides 3b-1 and 3b-2. The inversion of crystal orientation in the Y-axis direction causes interface distortion depending on temperature. Further, a stress caused by the interface distortion affecting the branch waveguides 3b-1 and 3b-2 varies the refractive indexes of the branch waveguides 3b-1 and 3b-2.

The distribution of distortion caused by the lattice distortion of the interface R in the substrate 2 varies according to the distance from the interface R. Therefore, by forming a polarization inversion region 6 with distances adjusted to the two branch waveguides 3b-1 and 3b-2, it makes possible to equalize variation in refractive indexes, which is the combination of a distortion component, which is caused by the lattice distortion of the interface R, affecting the branch waveguides 3b-1 and 3b-2, and of a distortion component that is generated on the substrate 2 by another distortion factor, between the branch waveguides 3b-1 and 3b-2.

Figure 2B:
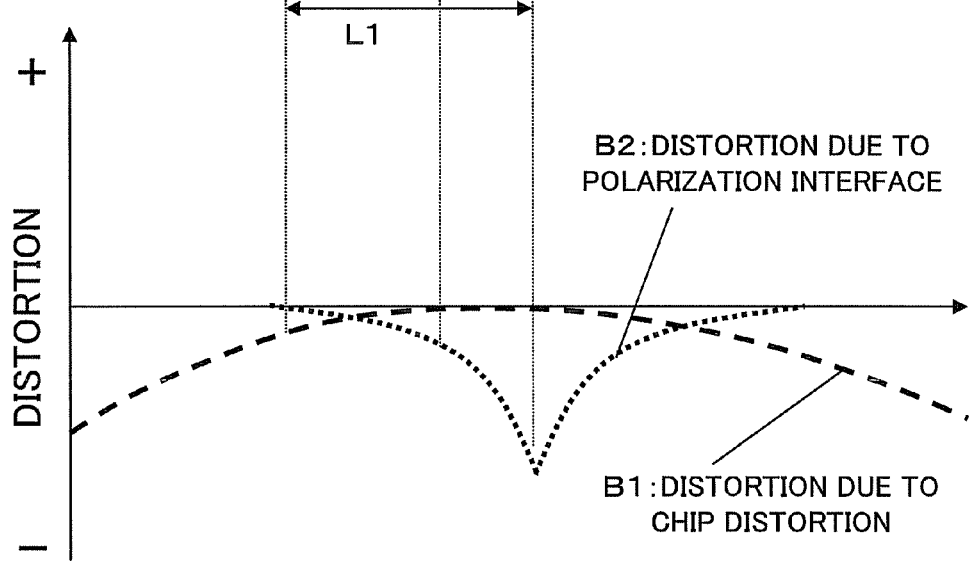

FIG. 2(b) is a schematic example of distortion generated on the section of AA' of the substrate 2 being at a low temperature. As depicted in FIG. 2(b), the above other distortion factor generated by another cause at low temperature seems to be chip distortion B1 that shrinks the substrate 2. Assuming that the optical device 1 is, for example, accommodated in a non-illustrated casing, the chip distortion B1 is caused when the casing has a higher coefficient of thermal expansion than that of the substrate 2 and/or when the glue that fixes the optical device to the casing or a buffer layer 4 (see FIG. 2(a)) has a higher coefficient of thermal expansion than that of the substrate 2.

In particular, in cases where the Mach-Zehnder optical waveguide 3 is formed so as to be deviated toward one side in the width direction of the LN substrate 2 as depicted in FIG. 1, the chip distortion B1 unevenly affects the two branch waveguides 3b-1 and 3b-2. For this reason, uneven influences from the chip distortion cause the branch waveguides 3b-1 and 3b-2 to have a difference in refractive indexes, which leads to the occurrence temperature drift at the operation point voltage described above.

In the meantime, since the optical device 1 of the first embodiment includes the above polarization inversion interface R formed thereon, interface distortion represented by reference number B2 can be generated when temperature is low enough to generate the chip distortion in FIG. 2(b). As depicted in FIG. 2(b), the largeness of the lattice distortion (or the stress distribution causing the lattice distortion) varies with the distance from the interface R.

In other words, adjusting the distances L1 and L2 (interface distances) of the interface R from the branch waveguides 3b-1 and 3b-2 can freely design the magnitude of the interface lattice distortion B2. Setting the interface R such that the sum of the distortion components B1 and B2 affecting the branch waveguide 3b-1 is set to be identical to the sum of the distortion components B1 and B2 affecting the branch waveguides 3b-1 and 3b-2, the branch waveguides 3b-1 and 3b-2 substantially have no difference in refractive index.

In the first embodiment, the interface R is formed only in the proximity of the branch waveguide 3b-2 so that the variation in refractive index caused by the lattice distortion substantially affects only the branch waveguide 3b-2 while the distance L1 is determined (otherwise, the distance between the branch waveguides 3b-1 and 3b-2 is determined) such that the lattice distortion does not affect the branch waveguide 3b-1. The variation in refractive index caused by the lattice distortion component B2 affecting the branch waveguide 3b-2 equalizes, in combination with the distortion component B1, the variations in refractive index of the branch waveguides 3b-1 and 3b-2 regardless of temperature.

FIG. 2(b) focuses on the AA' section to depict the distortion distribution, but the branch waveguides 3b-1 and 3b-2 keep substantially constant distances L1 and L2 from the interface R, respectively. That makes it possible to resolve amounts of distortion over the entire region from the upstream to the downstream of the branch waveguides 3b-1 and 3b-2 through which light propagates and also resolves the deviation in the refractive index over the entire branch waveguides 3b-1 and 3b-2.

FIG. 3 depicts a characteristic C1 of operation point drift caused by temperature variation corresponding to the variation in refractive index caused by the chip distortion represented by the B1 in FIG. 2(b); a characteristic C2 of operation point drift (an amount of operation point shift) caused by temperature variation corresponding to the variation in refractive index caused by the lattice distortion represented in the B2 of FIG. 2(b) when the polarization inversion region 6 including the interface R which the above L1 and L2 are adjusted is formed; and a characteristic C3 of operation point drift caused by temperature variation considering both characteristics C1 and C2.

As indicated in C3 of FIG. 3, forming the polarization inversion region 6 including the interface R having determined distances from the branch waveguides 3b-1 and 3b-2 makes the sum of an amount of operation point shift due to polarization lattice distortion and that due to the chip distortion constant regardless of temperature.

In addition, the polarization inversion region 6 including the interface R makes the respective sums of amounts of operation point shift affecting the branch waveguides 3b-1 and 3b-2 the same irrespective of temperature, so that operation point drift can be compensated by prohibiting generation of the refractive index difference $\Delta n(T)$ between the branch waveguides 3b-1 and 3b-2.

In other words, stresses that the chip distortion unevenly applies to the branch waveguides 3b-1 and 3b-2 are equalized by the use of the stress that the interface lattice distortion B2 applies to the branch waveguides 3b-1 and 3b-2, so that the distortions (which is proportional to the variation in refractive index) affecting the two branch waveguides 3b-1 and 3b-2 constituting the MZI can be approached to be symmetric.

Namely, the profile of (i.e., the interface R; R1-R2) of the boundary of the polarization inversion region 6 against the remaining region 7 having a polarity that is not inverted is configured such that the respective accumulated values of the distortion affecting the branch waveguides 3b-1 and 3b-2 over the coordinates along the light propagation direction are substantially the same.

In other words, the polarization inversion region 6 including the interface R is configured such that the respective accumulated values of a distortion component caused by the lattice distortion generated by temperature variation at the interface R and a distortion component caused by a factor other than the above lattice distortion affect the branch waveguides 3b-1 and 3b-2 over the coordinates along the light propagation direction are substantially the same. The first embodiment assumes that one of the causes of generation of $\Delta n(T)$ due to a distortion caused by a factor other than the above lattice distortion is a distortion component which is caused by warping of the substrate 2 itself and which affects the branch waveguides 3b-1 and 3b-2.

In the first embodiment, setting of the profile (i.e., the interface R; R1-R2) of the boundary of the polarization inversion region 6 and of the relative distances of the polarization inversion region 6 from the branch waveguides 3b-1 and 3b-2 can make the respective accumulated values of the distortion caused by the lattice distortion generated by temperature variation at the interface R and a distortion component caused by warp of the substrate 2 itself affect the branch waveguides 3b-1 and 3b-2 over the coordinates along the light propagation direction are substantially the same.

Since the branch waveguides 3b-1 and 3b-2 actually keep the respective constant distances L1 and L2 to the interface R, it is possible to inhibit the accumulation of the difference of the refractive indexes between the branch waveguides 3b-1 and 3b-2 over the entire region from the upstream to the downstream of the branch waveguides 3b-1 and 3b-2 through which light propagates. In other words, the profile (i.e., the interface R; R1-R2) of the boundary of the polarization inversion region 6 and the branch waveguides 3b-1 and 3b-2 can be configured such that the respective sums of the distortions that affect the branch waveguides 3b-1 and 3b-2 are substantially the same along the coordinate in the light propagating direction.

The above description made with reference to the configuration of FIG. 1 assumes that the above lattice distortion generated at the polarization inversion region 6 and the remaining region 7 interposing the interface R therebetween that have crystal orientations (+Y) of a direction parallel to the LN substrate 2 face and perpendicular to the branch waveguides 3b-1 and 3b-2, one of which orientations is inverted to the other. Other examples of generation of such a lattice distortion can be the modes depicted in FIGS. 4(a), 4(b), and 4(d).

Figure 4:
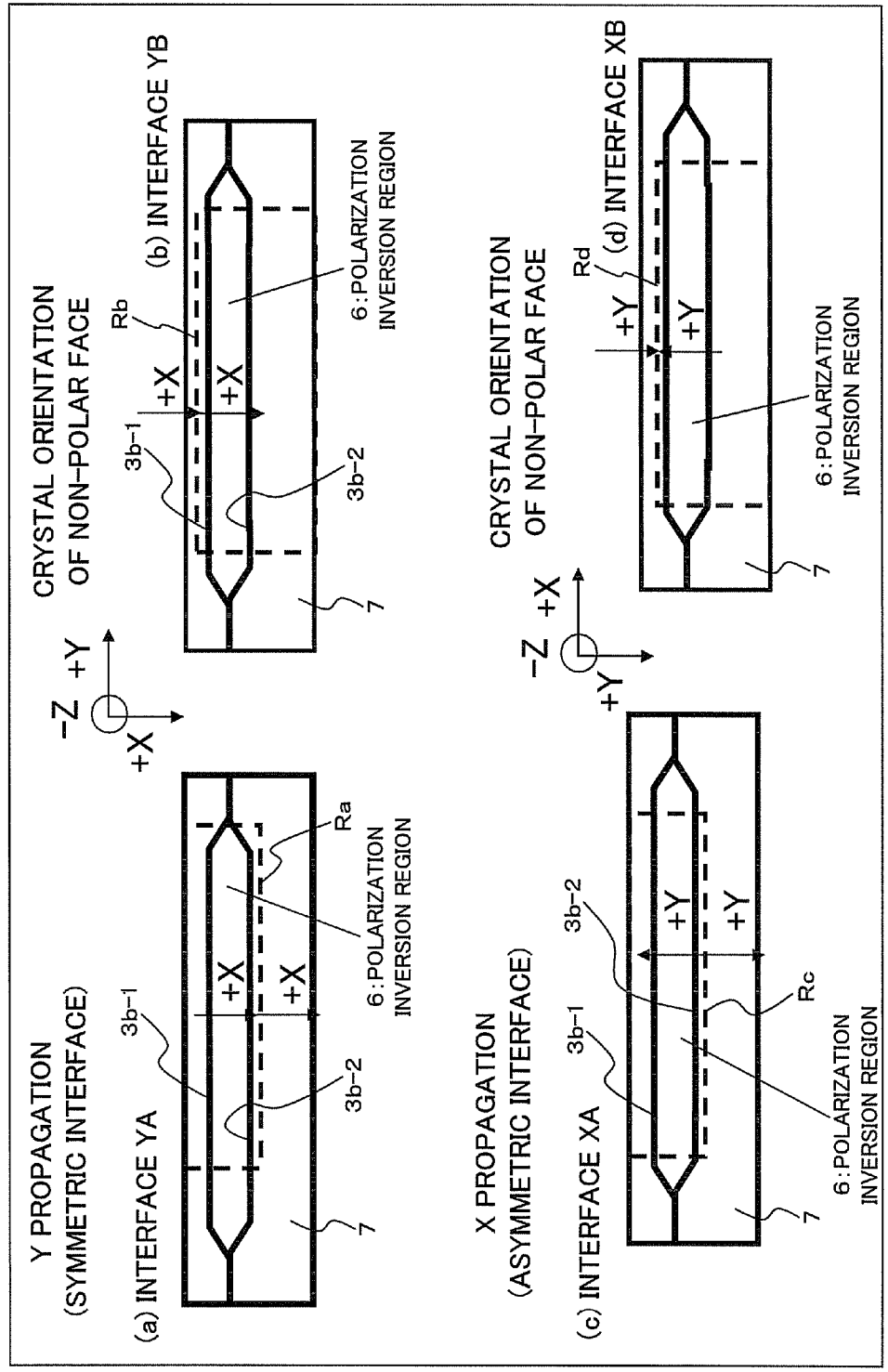
FIG. 4 are diagrams depicting various modes of the direction of forming an optical waveguide and the direction of polarization inversion.

In the mode depicted in FIG. 4(a), the branch waveguides 3b-1 and 3b-2 are formed along the Y axis (Y propagation) of the crystal axis and the interface Ra (the interface YA) formed in the vicinity of the branch waveguide 3b-2 is inverted with the Y axis or the Z axis. In addition, in the mode depicted in FIG. 4(b), the branch waveguides 3b-1 and 3b-2 are formed along the Y axis (Y propagation) of the crystal axis and the interface Rb (the interface YB) formed in the vicinity of the branch waveguide 3b-1 is inverted with the Z axis. In these modes, the light propagation direction on the surface of the LN substrate 2 is perpendicular to the X axis and the crystal is formed in the same direction. Further, in the mode depicted in FIG. 4(d), the branch waveguides 3b-1 and 3b-2 are formed along the X axis (X propagation) of the crystal axis and the interface Rc (the interface XB) formed in the vicinity of the branch waveguide 3b-2 is to face the crystal orientation (+Y).

The mode depicted in FIG. 4(c) has the same configuration as that of FIG. 1 described above. The branch waveguides 3b-1 and 3b-2 are formed along the X axis (X propagation) of the crystal axis and the interface Rd (the interface XA) formed in the vicinity of the branch waveguide 3b-1 is inverted with the Y axis or the Z axis. In the modes depicted in FIGS. 4(c) and 4(d), the light propagation direction on the surface of the LN substrate 2 is perpendicular to the Y axis and the crystal is formed in the opposite directions to each other.

In all the modes depicted in FIGS. 4(a) to 4(d), the interfaces Ra-Rd are formed in the vicinity of either branch waveguide 3b-1 or 3b-2, so that lattice distortion that the interfaces Ra-Rd affect the branch waveguide 3b-1 causes the two branch waveguides 3b-1 and 3b-2 to have the same variation in refractive index. In all the modes of FIGS. 4(a) to 4(d), the closer the distance is between the interface Ra-Rd and the branch waveguides 3b-1 and 3b-2 near the Ra-Rd, the larger the effect of the lattice distortion that the branch waveguides 3b-1 and 3b-2 receive will be.

Figure 5A:
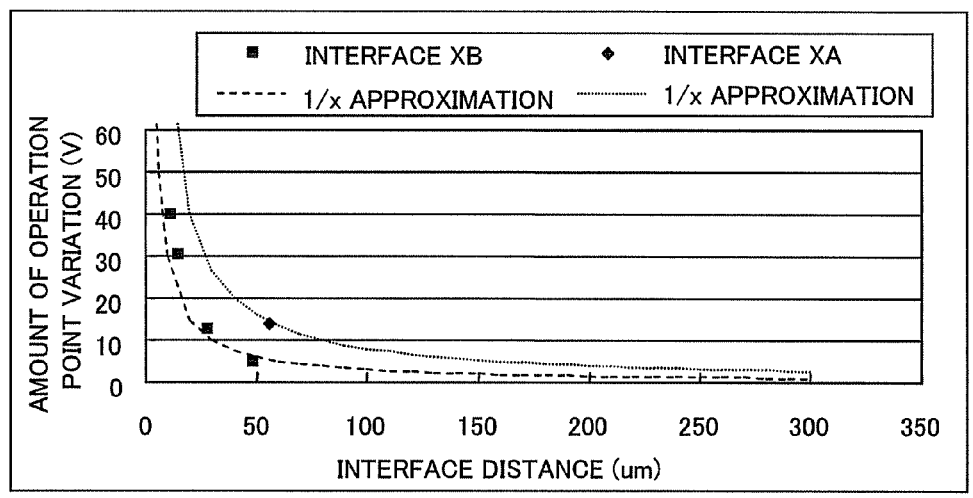
FIG. 5(a) is illustrating operation point variation characteristics in the configurations of FIGS. 4(c) and 4(d)
Figure 5B:
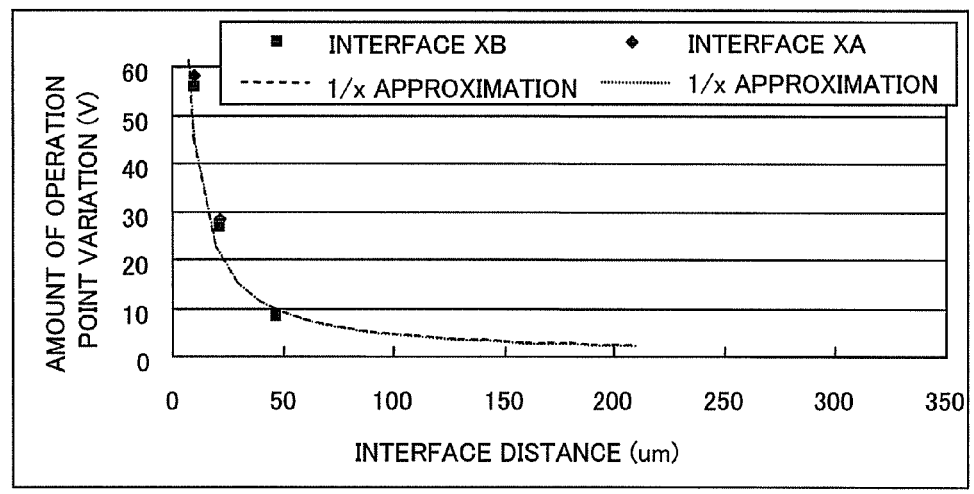
FIG. 5(b) is illustrating operation point variation characteristics in the configurations of FIGS. 4(a) and 4(b)

Specifically, in the configurations depicted in FIGS. 4(a) to 4(d), forming interfaces Ra-Rd serving as polarization interfaces in the vicinity only of either branch waveguide 3b-1 or 3b-2 and measurement of interface distances (see L1 and L2 of FIG. 1) and an amount of operation point variation caused from temperature variation make it possible to estimate the amounts of distortion generated in respective interfaces due to temperature variation. FIG. 5(a) denotes operation point variation characteristics in accordance with the interface distances (L1 and L2) at the temperature variation of 80° C. to −5° C. in the configurations of FIGS. 4(c) and 4(d). FIG. 5(b) denotes operation point variation characteristics in accordance with the interface distances (L1 and L2) at the temperature variation of 80° C. to −5° C. in the configurations of FIGS. 4(a) and 4(b).

Here, the black rhombuses in FIG. 5(a) represent operation point variation characteristics at the interface distance L2 in the configuration depicted in FIG. 4(c) (the interface XA) and the black squares in FIG. 5(a) represent operation point variation characteristics at the interface distance L1 in the configuration depicted in FIG. 4(c) (the interface XB). The black rhombuses in 5(b) represent operation point variation characteristics at the interface distance L2 in the configuration depicted in FIG. 4(a) (the interface YA) and the black squares in FIG. 5(b) represent operation point variation characteristics at the interface distance L1 in the configuration depicted in FIG. 4(d) (the interface YB).

An amount of operation point variation is proportional to the difference of the distortion between the two branch waveguides 3b-1 and 3b-2, and can therefore be assumed to be proportional to the distortion caused from the interface in these cases. As depicted in FIGS. 5(a) and 5(b), it can be confirmed that the lattice distortion affecting from the interface makes the amount of distortion, that is an amount of operation point variation, less in inverse proportional to the interface distance. As depicted in FIGS. 5(a) and 5(b), in all the interface settings, the branch waveguides 3b-1 and 3b-2 are identical in the direction of the distortion affected, in inclination characteristics associated with interface distances of operation point variation characteristics. Therefore, the optical device can be configured to have a constant operation point variation not varying with temperature in any interface setting.

As described above, in the first embodiment, the profile (i.e., the interface R; R1-R2) of the boundary of the polarization inversion region 6 against the remaining region 7 having a polarity that is not inverted is configured such that the respective accumulated values of the distortion affecting the branch waveguides 3b-1 and 3b-2 over the coordinates along the light propagation direction are substantially the same. Therefore, it is advantageously possible to compensate temperature drift, particularly caused by a stress due to the difference of a coefficient of thermal expansion between the substrate 2 and another component in contact with the substrate 2, irrespective of the formed position of waveguide on the substrate.

[A1] First Modification of the First Embodiment

Figure 6:
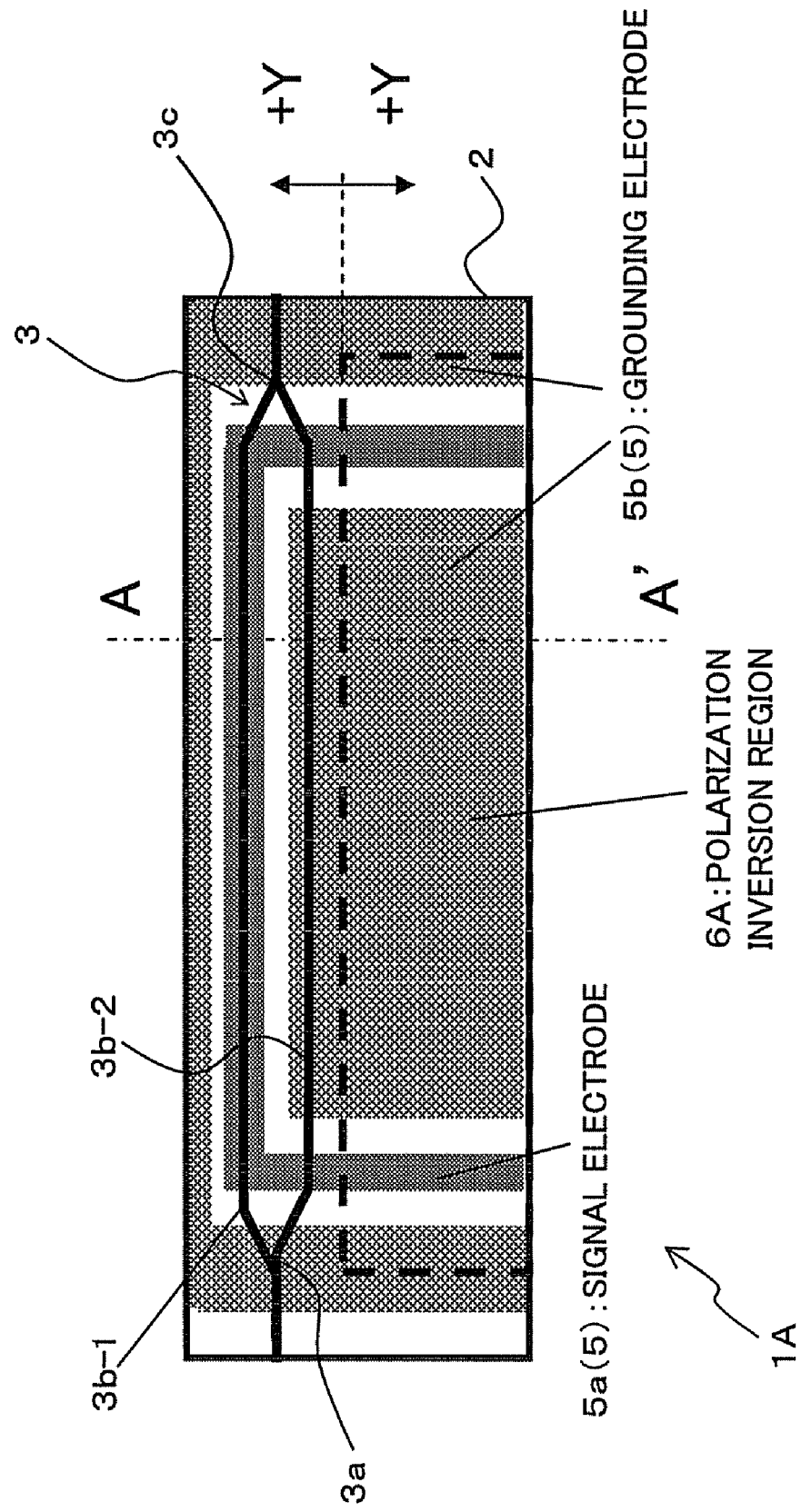
FIG. 6 is a diagram illustrating an optical device according to a first modification of the first embodiment of the present invention.
Figure 7A:
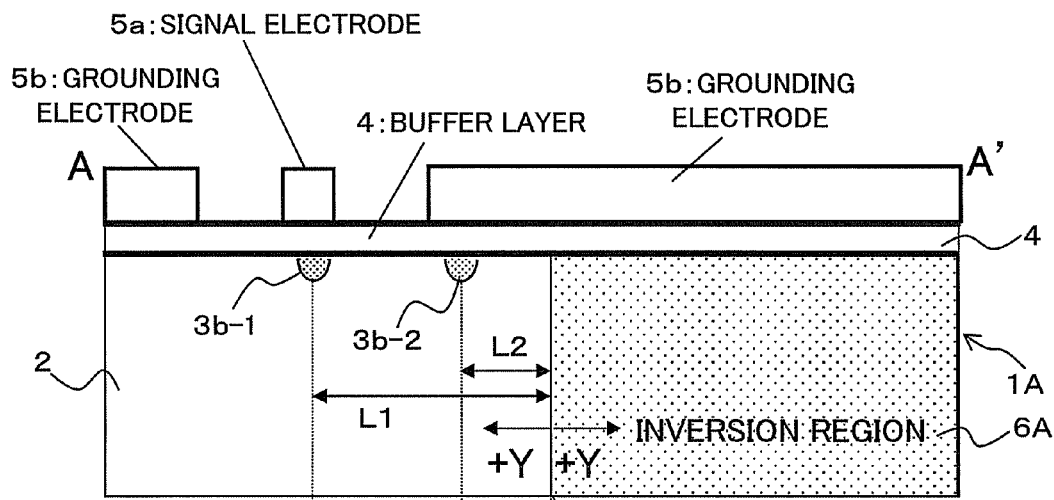
FIG. 7 (a) is a sectional view of an optical device illustrated in FIG. 6.

FIG. 6 illustrates an optical device 1A according to a first modification of the first embodiment of the present invention, and FIG. 7(a) is a AA' sectional view of the optical device 1A of FIG. 6. The optical device 1A of FIGS. 6 and 7(a) is different in the position of a polarization inversion region 6A from the optical device 1 illustrated in FIG. 1, but in identical in the remaining configuration to the optical device 1 of FIG. 1. In FIGS. 6 and 7(a), reference numbers identical to those in FIG. 1 represent similar parts and elements to those of FIG. 1. In other words, the polarization inversion region 6A included in the optical device 1A of FIG. 6 is formed distant from the region in which the Mach-Zehnder optical waveguide 3 is formed and serves as an interface RA that includes a linear region RA1-RA2 having a constant distance from the outer edge of the branch waveguide 3b-2, which is one of the branch waveguides 3b-1 and 3b-2 arranged in parallel to each other.

Figure 7B:
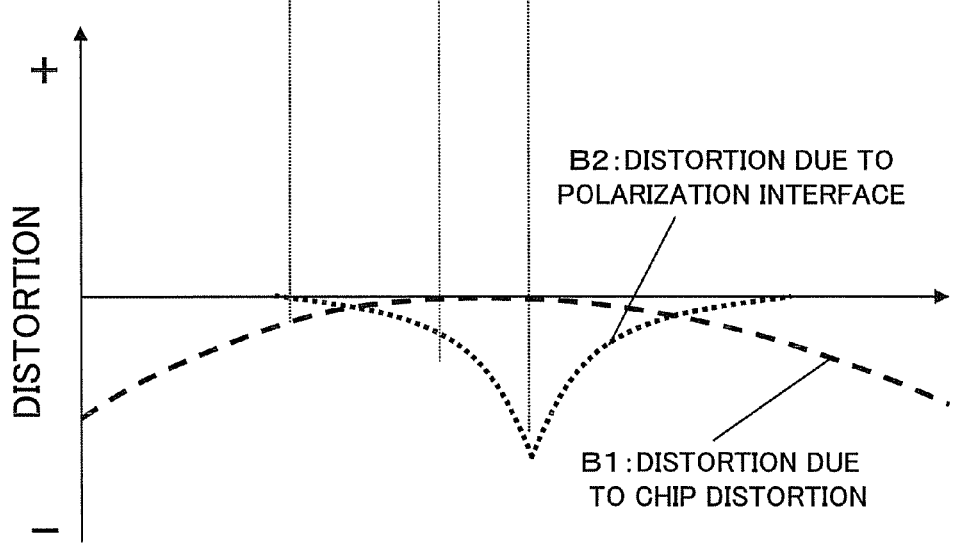

Even if the polarization inversion region 6A is disposed outside the Mach-Zehnder optical waveguide 3 as the optical device 1A of FIG. 6, the magnitude of the interface lattice distortion B2 comes to be smaller in accordance with increase in interface distance. FIG. 7(b) schematically illustrates distortion generated on the section AA' of the substrate 2 being at a low temperature. In the drawing, B1 represents the distribution of the chip distortion (i.e., the distortion of the substrate 2 itself) at low temperature, and B2 represents the distribution of the interface lattice distortion.

As denoted in FIG. 7(b), the respective amounts of distortion, including the distortion B1 of the substrate 2 itself, that affects the branch waveguides 3b-1 and 3b-2 can be equalized similarly to the first embodiment, and thereby the temperature drift can be reduced. The AA' section is focused to figure the distribution of the distortion in FIG. 7(b). However, since the branch waveguides 3b-1 and 3b-2 actually keep the constant distances L1 and L2 from the interface RA, respectively, it is possible to practically resolve the amounts of distortion (or the refractive index deviation over the entire 3b-1 and 3b-2) which depends on the variation in temperature over the entire region from the upstream to the downstream of the branch waveguides 3b-1 and 3b-2 through which light propagates. Consequently, the first modification can result in the same advantages as the first embodiment.

In addition, since the polarization inversion region 6A is formed outside the Mach-Zehnder optical waveguide 3, the interface distances and the interface affecting length (i.e., the length of the waveguide along which the lattice distortion affecting the branch waveguides 3b-1 and 3b-2 so as to result in variation in refractive index) can be freely designed without annoying influence on the modulation characteristics.

[A2] Second Modification of the First Embodiment

Figure 8:
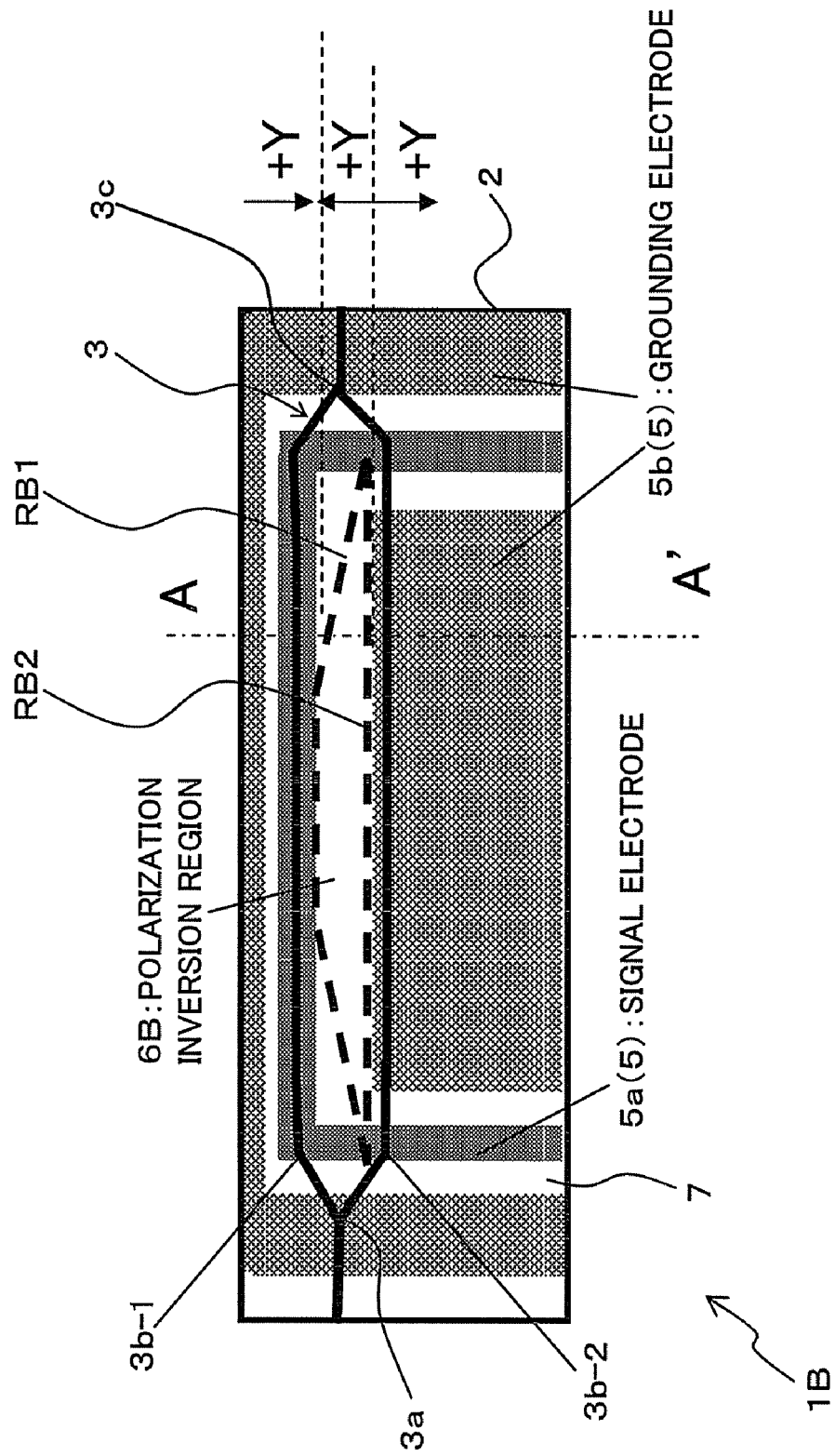
FIG. 8 is a diagram illustrating an optical device according to a second modification of the first embodiment of the present invention.
Figure 9A:
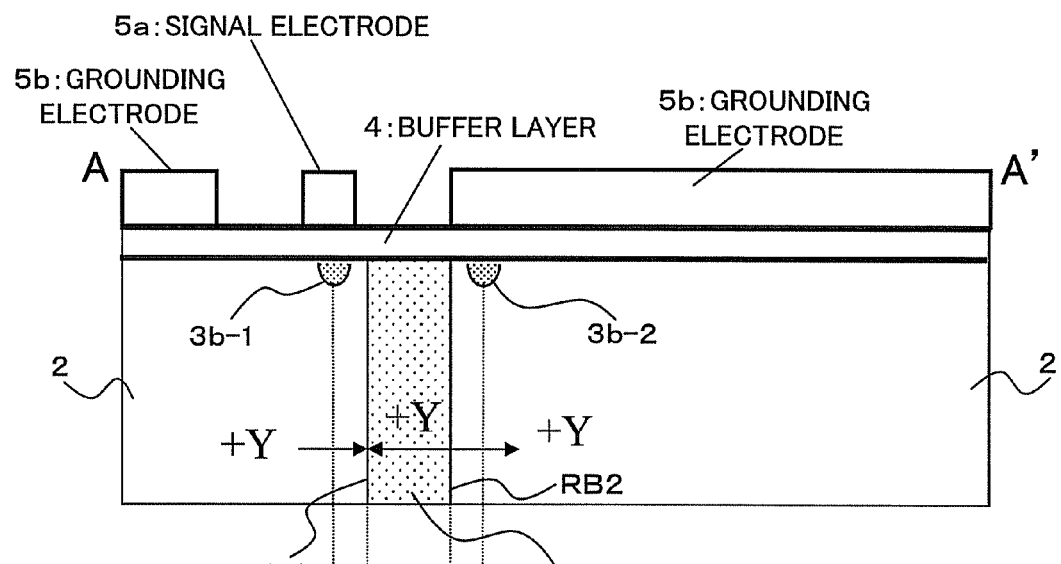
FIG. 9(a) is a sectional view of an optical device illustrated in FIG. 8.

FIG. 8 illustrates an optical device 1B according to a second modification of the first embodiment of the present invention, and FIG. 9(a) is a AA' sectional view of the optical device 1B of FIG. 8. The optical device 1B of FIGS. 8 and 9(a) is different in the position of a polarization inversion region 6B from the optical device 1 illustrated in FIGS. 1 and 6, but is identical in the remaining configuration of the optical device 1 of FIG. 1. In FIGS. 8 and 9(a), reference numbers identical to those in FIG. 1 represent similar parts and elements to those of FIG. 1.

Specifically, the polarization inversion region 6B included in the optical device 1B of FIGS. 8 and 9(a) is formed in an area between the two branch waveguides 3b-1 and 3b-2 and includes, as the boundary against the remaining region 7, the polarity of which is not inverted, a first linear region RB1 in the vicinity of the branch waveguide 3b-1 serving as the first branch waveguide along the light propagation direction and a second linear region RB2 in the vicinity of the branch waveguide 3b-2 serving as the second branch waveguide along the light propagation direction.

Further, the first linear region RB1 has a shape that varies the distance to the branch waveguide 3b-1 from the upstream to the downstream of the light propagation direction while the second linear region RB2 has a shape that has a constant distance to the branch waveguide 3b-2 from the upstream to the downstream of the light propagation direction.

Figure 9B:
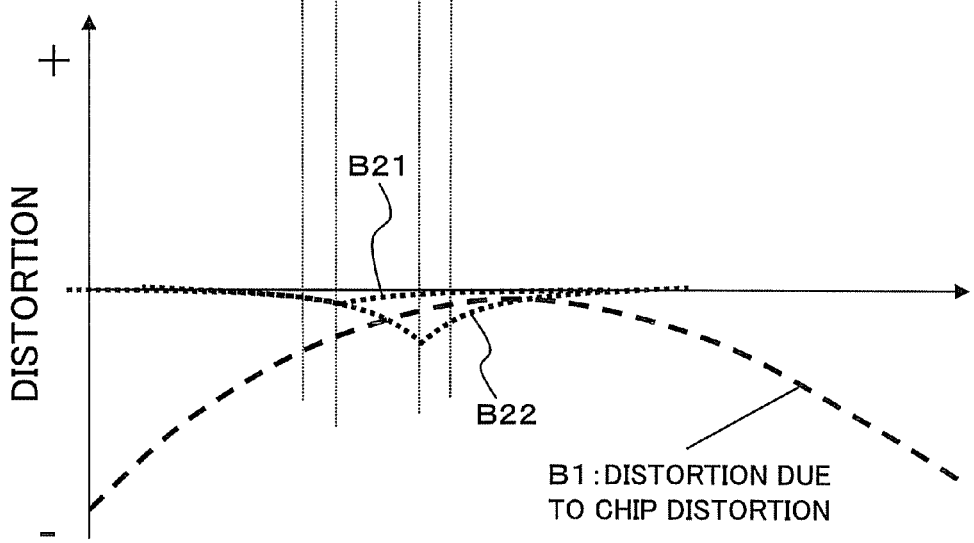
FIG. 9(b) is a diagram schematically illustrating an example of distortion generated on the section of FIG. 9(a) of a substrate being at a low temperature.

When the polarization inversion region 6B is formed at an area sandwiched between branch waveguides 3b-1 and 3b-2 constituting the Mach-Zehnder optical waveguide 3 as the optical device 1B of the FIG. 8, interface lattice distortion B21 and B22 caused by the two linear regions RB1 and RB2 that affect both branch waveguides 3b-1 and 3b-2 as illustrated in FIG. 9(b). Also in this case, the magnitudes of the interface lattice distortions B21 and B22 that affect the branch waveguides 3b-1 and 3b-2 from the linear regions RB1 and RB2 decrease in accordance with increase in interface distance. FIG. 9(b) schematically illustrates distortion generated on the section AA' of the substrate 2 being at a low temperature. In the drawing, B1 represents the distribution of the chip distortion (i.e., the distortion of the substrate 2 itself) at low temperature, and B21 and B22 represent the distributions of the interface lattice distortions.

Figure 10A:
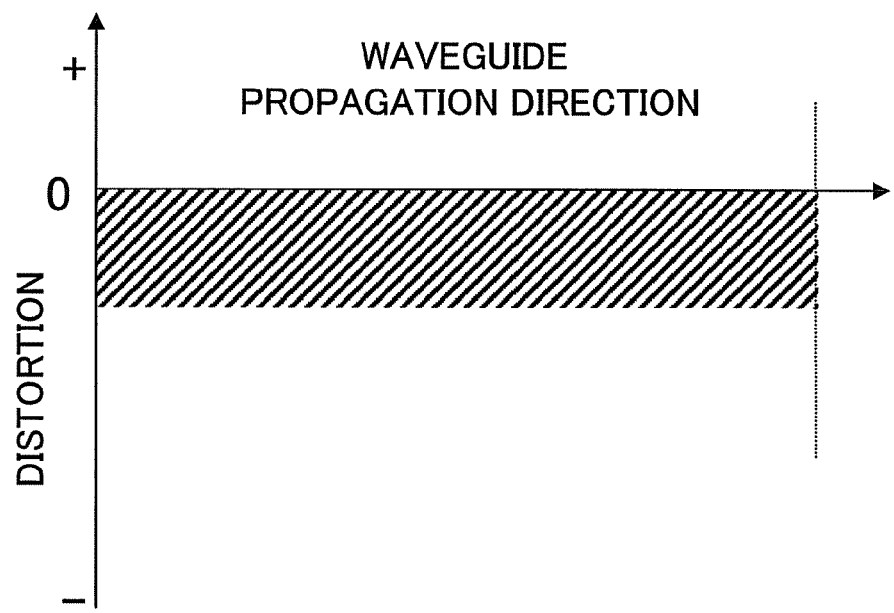
FIG. 10(a) is depicting a component of chip distortion received by a branch waveguide and FIG. 10(b) is depicting a component of interface lattice distortion received by the branch waveguide.
Figure 10B:
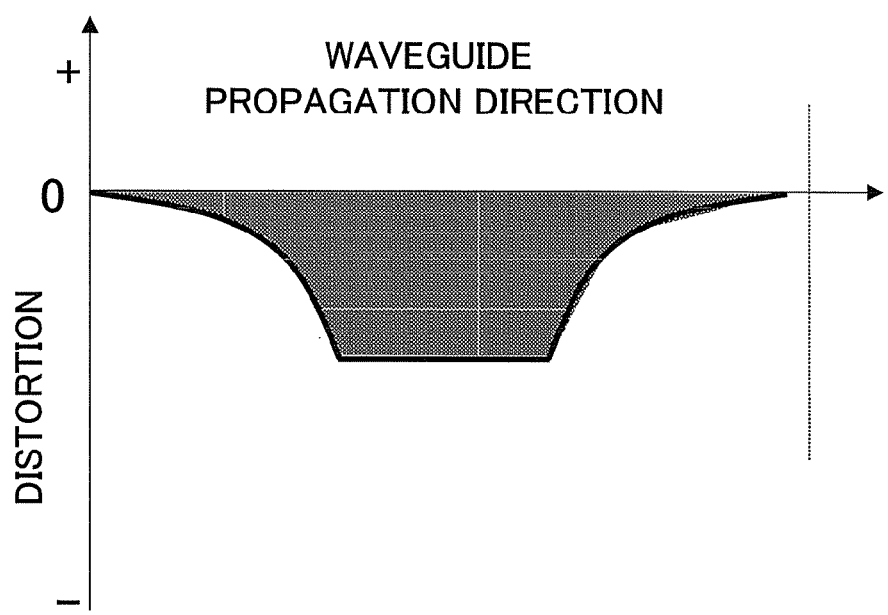
Figure 11A:
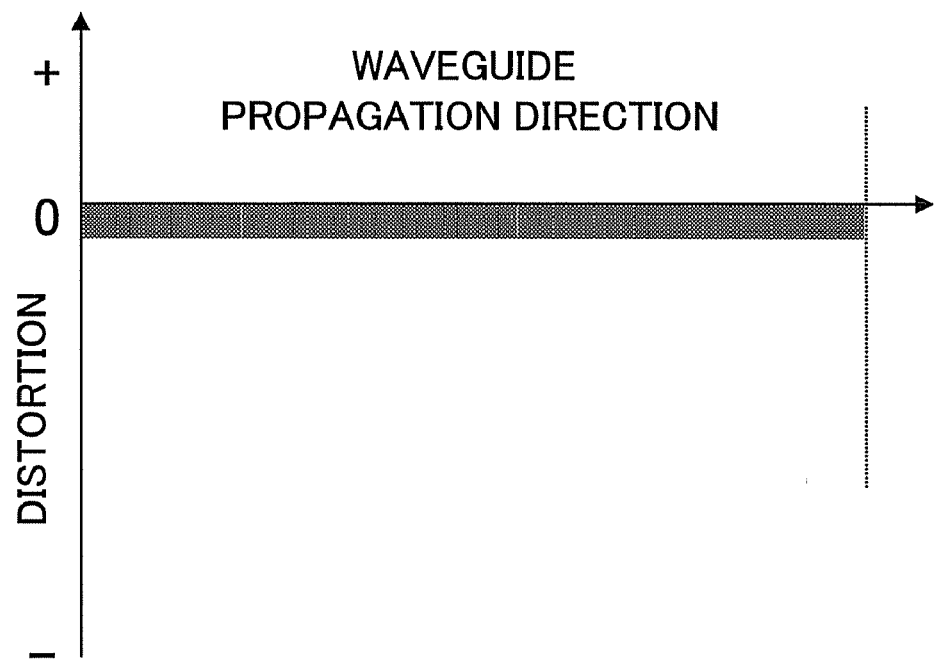
FIG. 11(a) is depicting a component of chip distortion received by a branch waveguide and FIG. 11(b) is depicting a component of interface lattice distortion received by the branch waveguide.
Figure 11B:
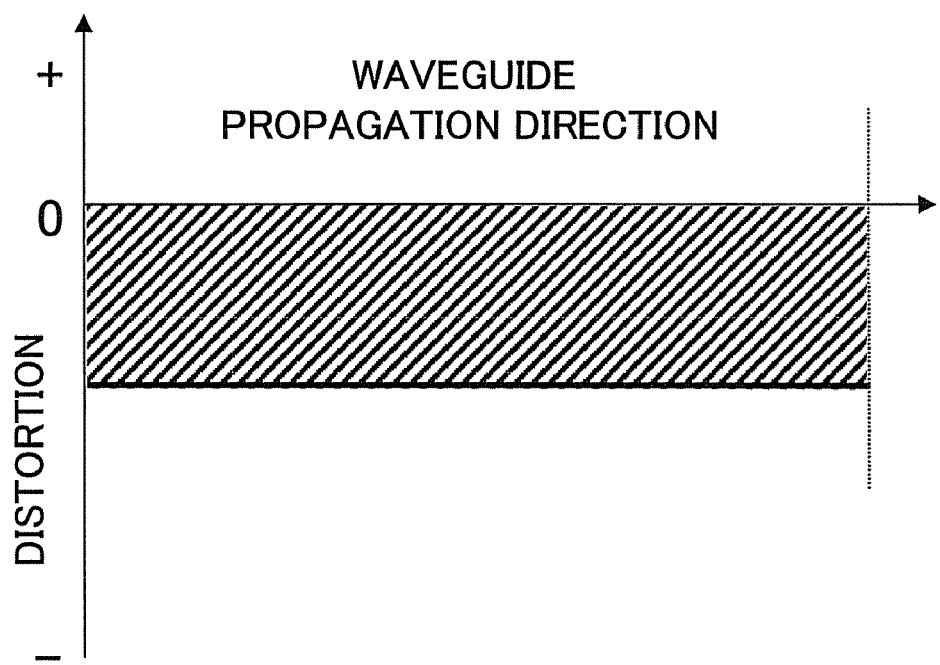

FIGS. 10(a) and 10(b) denote an amount of distortion affecting the branch waveguide 3b-1 along the waveguide position at a certain temperature deviation width, which the amount is divided into a component caused by the chip distortion (B1) and a component caused by the interface lattice distortion. FIGS. 10(a) and 10(b) represent an amount of distortion caused by the chip distortion (B1) and an amount of distortion caused by the interface lattice distortion, respectively. Similarly, FIGS. 11(a) and 11(b) denote an amount of distortion affecting the branch waveguide 3b-2 along the waveguide position at a certain temperature deviation width, which amount is divided into a component caused by the chip distortion (B1) and a component caused by the interface lattice distortion. FIGS. 11(a) and 11(b) represent an amount of distortion caused by the chip distortion (B1) and an amount of distortion caused by the interface lattice distortion, respectively.

Here, since the branch waveguides 3b-1 and 3b-2 are usually formed along the longitudinal direction of the substrate 2, the chip distortion (B1) of the substrate 2 causes distortion that uniformly affects the entire region of the branch waveguides 3b-1 and 3b-2 in the direction (i.e., the width direction of the substrate 2) perpendicular to the light propagation direction through the branch waveguides 3b-1 and 3b-2 regardless of the position relative to the propagation (flowing) through the branch waveguides 3b-1 and 3b-2. The branch waveguide 3b-1 is formed closer to the edge of the substrate than the branch waveguide 3b-2, so that the chip distortion affecting the branch waveguide 3b-1 of FIG. 10(a) is larger than the chip distortion affecting the branch waveguide 3b-2 of FIG. 11(b).

The first linear region RB1 takes the shape varying the distance to the branch waveguide 3b-1 from the upstream to the downstream along the light propagation direction. Specifically, the profile is relatively distant from the branch waveguide 3b-1 in the upstream region, comes closer to the branch waveguide 3b-1 in the middle region, and deviates from the branch waveguide 3b-1 in the downstream region. With this configuration, the amount of interface lattice distortion affecting the branch waveguide 3b-1 has a distribution that exhibits the maximum at the middle region and decreases as deviating to the upstream or the downstream from the middle region as depicted in FIG. 10(b).

Further, since the second linear region RB2 has a shape having a constant distance to the branch waveguide 3b-2 from the upstream to the downstream along the light propagation direction, the amount of interface lattice distortion affecting the branch waveguide 3b-2 is a constant value along the entire region of the branch waveguide 3b-1 as depicted in FIG. 11(b).

In FIGS. 10(b) and 11(b), components of interface lattice distortion affected by linear regions not in the vicinity of each of the branch waveguides 3b-1 and 3b-2 (distortion affecting the branch waveguide 3b-1 from the second linear region RB2 and distortion affecting the branch waveguide 3b-2 from the first linear region RB1) are relatively smaller than the components caused by the nearer linear regions, and therefore are not considered here.

The variations in refractive index that the branch waveguides 3b-1 and 3b-2 undergo are proportional to the accumulative sum of the amount of chip distortion and an amount of interface lattice distortion. Accordingly, the variation in refractive index that the branch waveguide 3b-1 undergoes corresponds to the sum of the areas of amounts of distortion along the waveguide propagation direction depicted in FIGS. 10(a) and 10(b); and the variation in refractive index that the branch waveguide 3b-2 undergoes corresponds to the sum of the areas of amounts of distortion depicted in FIGS. 11(a) and 11(b).

In the optical device 1B illustrated in FIG. 8, the linear regions RB1 and RB2 of the polarization inversion region 6B (and the branch waveguides 3b-1 and 3b-2) are formed such that the above sums of the areas come to be identical to each other, so that the amount of temperature drift can be inhibited similarly to the first embodiment.

[A3] Third Modification of the First Embodiment

Figure 12:
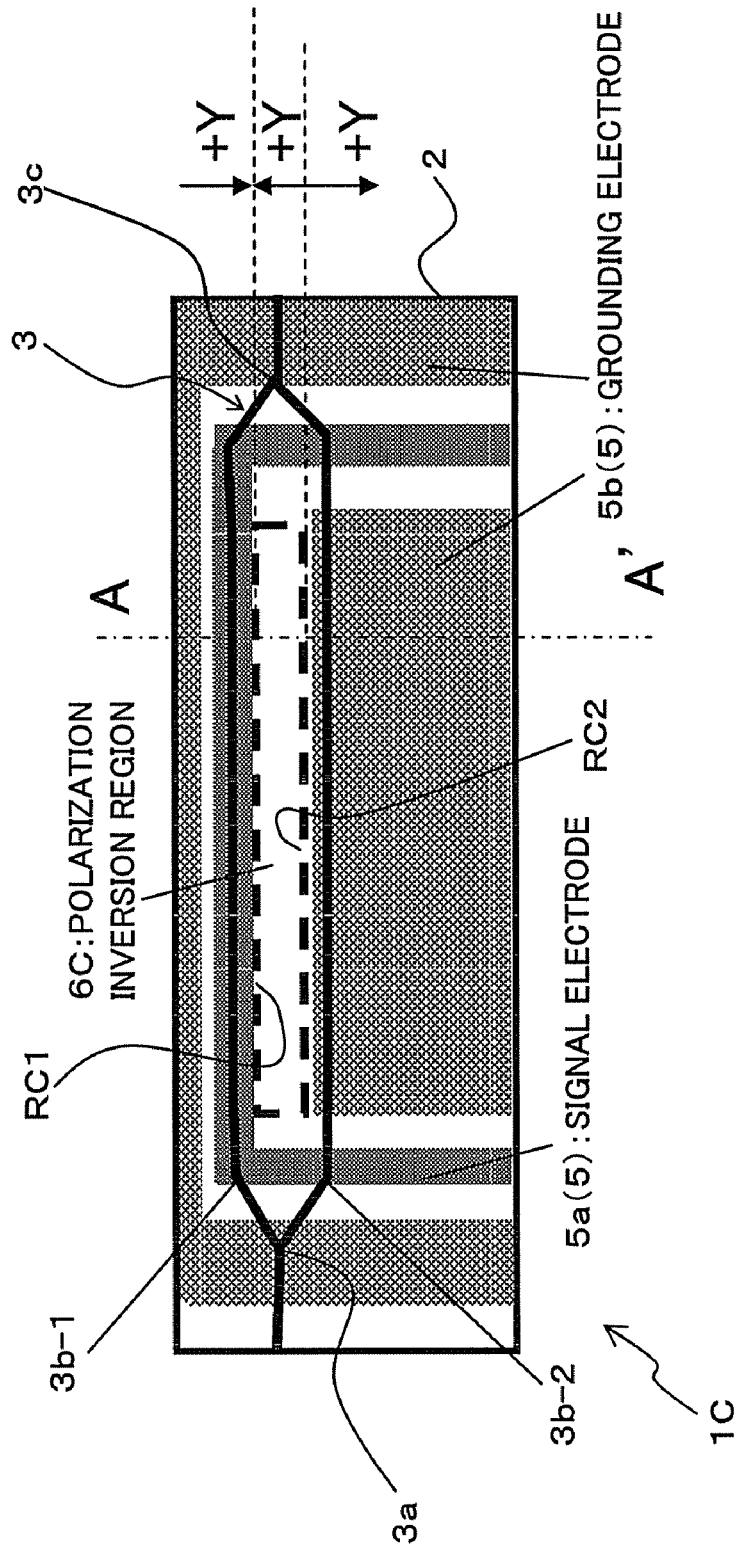
FIG. 12 is a diagram illustrating an optical device according to a third modification of the first embodiment of the present invention.
Figure 13A:
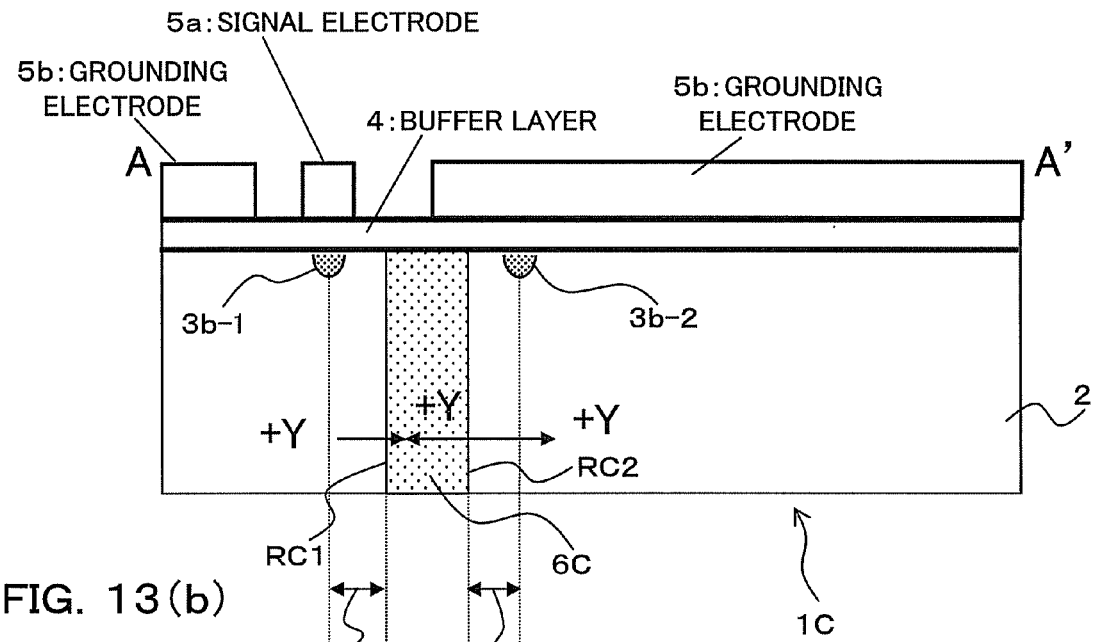
FIG. 13(a) is a sectional view of an optical device illustrated in FIG. 12.

FIG. 12 illustrates an optical device 1C according to a third modification of the first embodiment of the present invention, and FIG. 13(a) is a AA' sectional view of the optical device 1C of FIG. 12. The optical device 1C of FIGS. 12 and 13(a) is different in the position of a polarization inversion region 6C from the optical device 1 illustrated in FIG. 1, but is identical in the remaining configuration of the optical device 1 of FIG. 1. In FIGS. 12 and 13(a), reference numbers identical to those in FIG. 1 represent similar parts and elements to those of FIG. 1.

Here, the polarization inversion region 6C included in the optical device 1C of FIG. 6 is formed in an area sandwiched between the two branch waveguides 3b-1 and 3b-2 and includes, as the boundary against the remaining region 7, the polarity of which is not inverted, a first linear region RC1 having a constant first distance LC1 from the entire branch waveguide 3b-1 serving as the first branch waveguide from the upstream to the downstream along the light propagation direction and a second linear region RC2 having a constant second distance LC2 from the branch waveguide 3b-2 serving as the second branch waveguide from the upstream to the downstream along the light propagation direction.

The first distance LC1 and the second distance LC2 are determined such that the respective accumulated amounts of distortion affecting the branch waveguides 3b-1 and 3b-2 along the coordinate in the light propagation direction are substantially identical to each other.

Figure 13B:
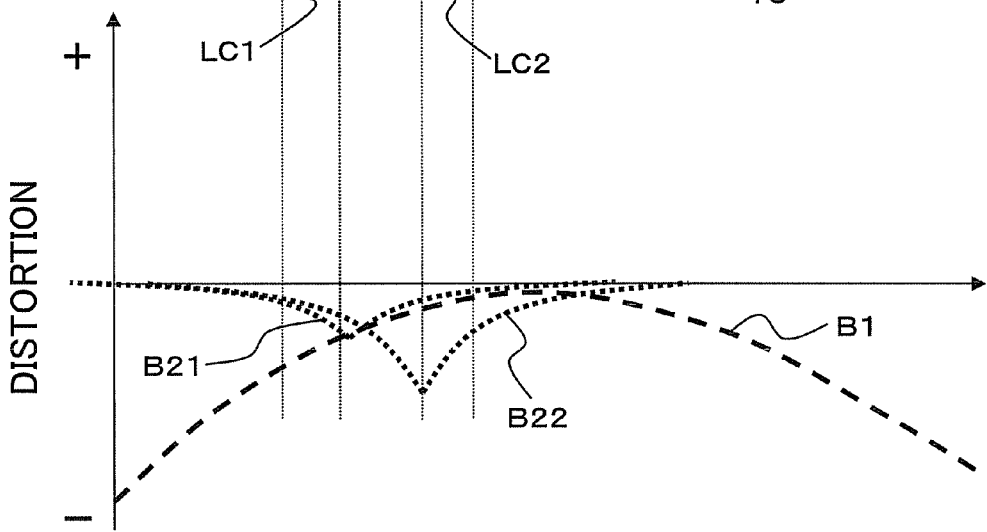
FIG. 13(b) is a diagram schematically illustrating an example of distortion generated on the section of FIG. 13(a) of a substrate being at a low temperature.

FIG. 13(b) schematically illustrates distortion generated on the section of AA' of the substrate 2 being at a low temperature. In the same drawing, B1 represents the distortion of a chip (the distortion of the substrate 2 itself) being at low temperature, B21 represents the distribution of the interface lattice distortion caused by the first linear region RC1, and B22 represents the distribution of the interface lattice distortion caused by the second linear region RC2.

Also the optical device 1C having the above configuration can reduce the temperature drift because the amounts of distortion, including the distortion B1 of the substrate 2 itself, that affect the branch waveguides 3b-1 and 3b-2 can be equalized. FIG. 13(b) focuses on the AA' section to depict the distortion distribution, but the branch waveguides 3b-1 and 3b-2 keep substantially constant distances LC1 and LC2 from the first linear region RC and the second linear region RC2, respectively. That makes it possible to resolve an amount of distortion (or an amount of variation in refractive index) over the entire region from the upstream to the downstream of the branch waveguides 3b-1 and 3b-2 through which light propagates, so that the occurrence of temperature drift can be inhibited similarly to the first embodiment.

FIGS. 14 (a) and 14(b) denote experimental results performed in order to confirm effect of reduction in temperature drift of the prototype optical device 1C. Here, the Y direction is a direction perpendicular to the first and the second linear regions RC1 and RC2 serving interfaces of the polarization inversion region 6C and to the branch waveguides 3b-1 and 3b-2. The first and the second distances LC1 and LC2 are determined to be 40 μm, and an interface affecting length (along which the lattice distortion to exert the influence in the form of the variation in refractive index on the branch waveguides 3b-1 and 3b-2) is determined to be 18 mm.

However, in order to evaluate influence caused only by the interface distortion, the configuration of the electrode 5 and the Mach-Zehnder optical waveguide 3 were fabricated so as not to be deviated toward one side in the width direction of the substrate 2 (so as to be symmetric with respect to the center axis of the substrate 2). It is thereby confirmed that a device having the same configuration but not including the polarization inversion region 6C has a temperature drift approximately 0.

Figure 14A:
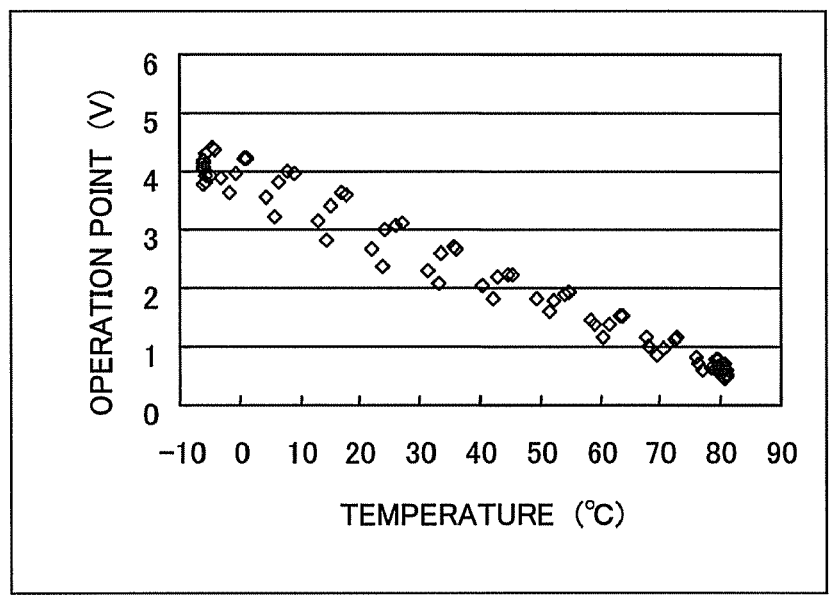
FIG. 14(a) and FIG. 14(b) are depicting the results of an experiment performed on a prototype optical device according to the third modification of the first embodiment to confirm the effects of reduction in temperature drift.
Figure 14B:
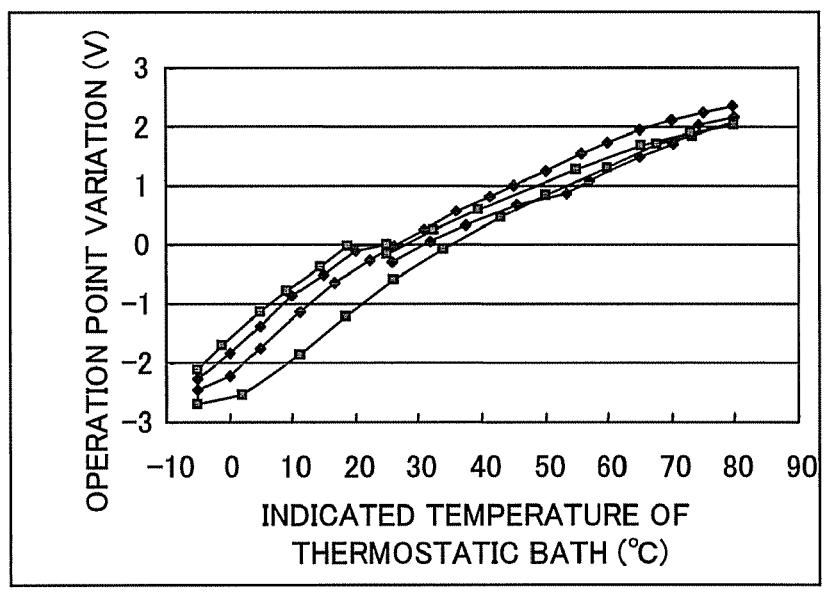

FIG. 14(b) depicts the characteristics of the operation point variation in which the abscissa and the ordinates represent temperature and an amount (voltage V) of operation point shift, respectively. The graph indicates that the interface distortion generates temperature drift of about 4 V. In the meantime, FIG. 14(a) depicts temperature drifts of a normal device not equipped with a polarization inversion region 6C, which the device has an electrode 5 of a symmetric configuration and the Mach-Zehnder optical waveguide 3 that deviates toward one side in the width direction of the substrate 2. Specifically, the chip width is 1.2 mm, the distance between the branch waveguide 3b-1 and the chip side edge is 200 μm or less, and the distance between the branch waveguide 3b-2 and the chip side edge is 800 μm or less, which mean an asymmetric configuration. As depicted in FIG. 14(a), a temperature drift occurs due to the chip distortion. As seen from a comparison between FIGS. 14(a) and 14(b), a temperature drift (see FIG. 14(a)) that caused when the Mach-Zehnder optical waveguide 3 deviates from the center of the chip, that is a deviation of an amount of a variation in operation point depending on temperature, can be sufficiently reduced by a temperature drift component (see FIG. 14(b)) caused by the interface lattice distortion.

[A4] A Fourth Modification of the First Embodiment

Figure 15:
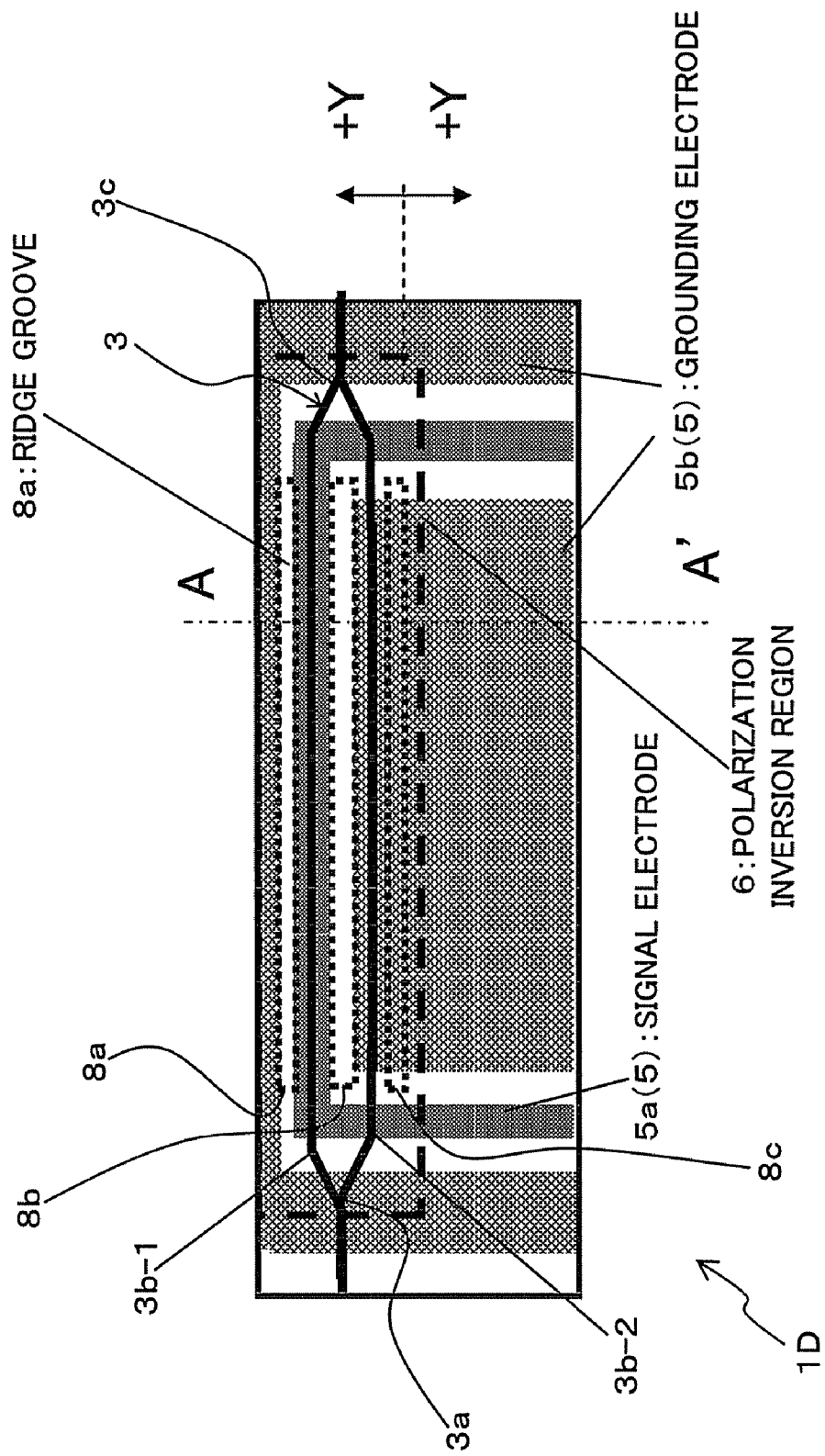
FIG. 15 is a diagram illustrating an optical device according to a fourth modification of the first embodiment of the present invention.
Figure 16A:
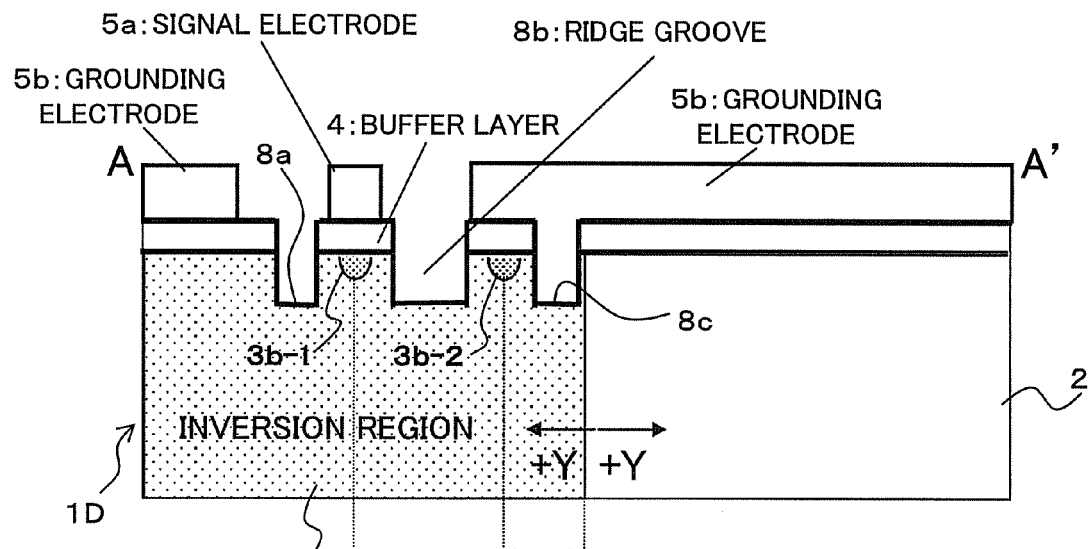
FIG. 16(a) is a sectional view of an optical device illustrated in FIG. 15, and FIG. 16 (b) is a diagram schematically illustrating an example of distortion generated on the section of (a) of a substrate being at a low temperature.

FIG. 15 illustrates an optical device 1D according to a fourth modification of the first embodiment of the present invention, and FIG. 16(a) is a AA' sectional view of the optical device 1D of FIG. 15. The optical device of FIGS. 15 and 16(a) forms grooves 8a-8c on both sides of the branch waveguides 3b-1 and 3b-2, which thereby serve as ridge waveguides for the purpose of broader bandwidths, differently from the first embodiment depicted in FIG. 1. The remaining configuration of the optical device 1D is identical with that depicted in FIG. 1.

Figure 16B:
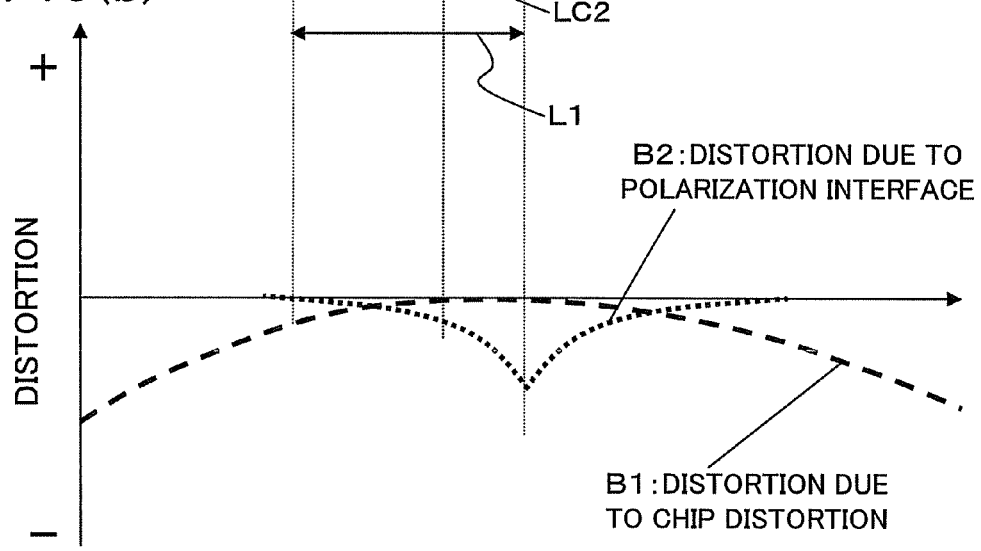

FIG. 16(b) schematically illustrates distortion generated on the section of AA' of the substrate 2 being at a low temperature. In the same drawing, B1 represents the distortion of a chip (the distortion of the substrate 2 itself) being at low temperature, and B2 represents the distribution of the interface lattice distortion. Also in this case, the temperature drift can be reduced because the amounts of distortion that affects the branch waveguides 3b-1 and 3b-2 can be equalized in combination with the distortion B1 of the substrate 2 itself. FIG. 16(b) focuses on the AA' section to depict the distortion distribution, but the branch waveguides 3b-1 and 3b-2 keep substantially constant distances L1 and L2 from the interface RA, respectively. That makes it possible to resolve an amount of temperature-dependent distortion over the entire region from the upstream to the downstream of the branch waveguides 3b-1 and 3b-2 through which light propagates, or to resolve the refractive index deviation over the entire region, so that the advantages of the first embodiment can be ensured.

[A5] Fifth Embodiment of the First Embodiment

Figure 17:
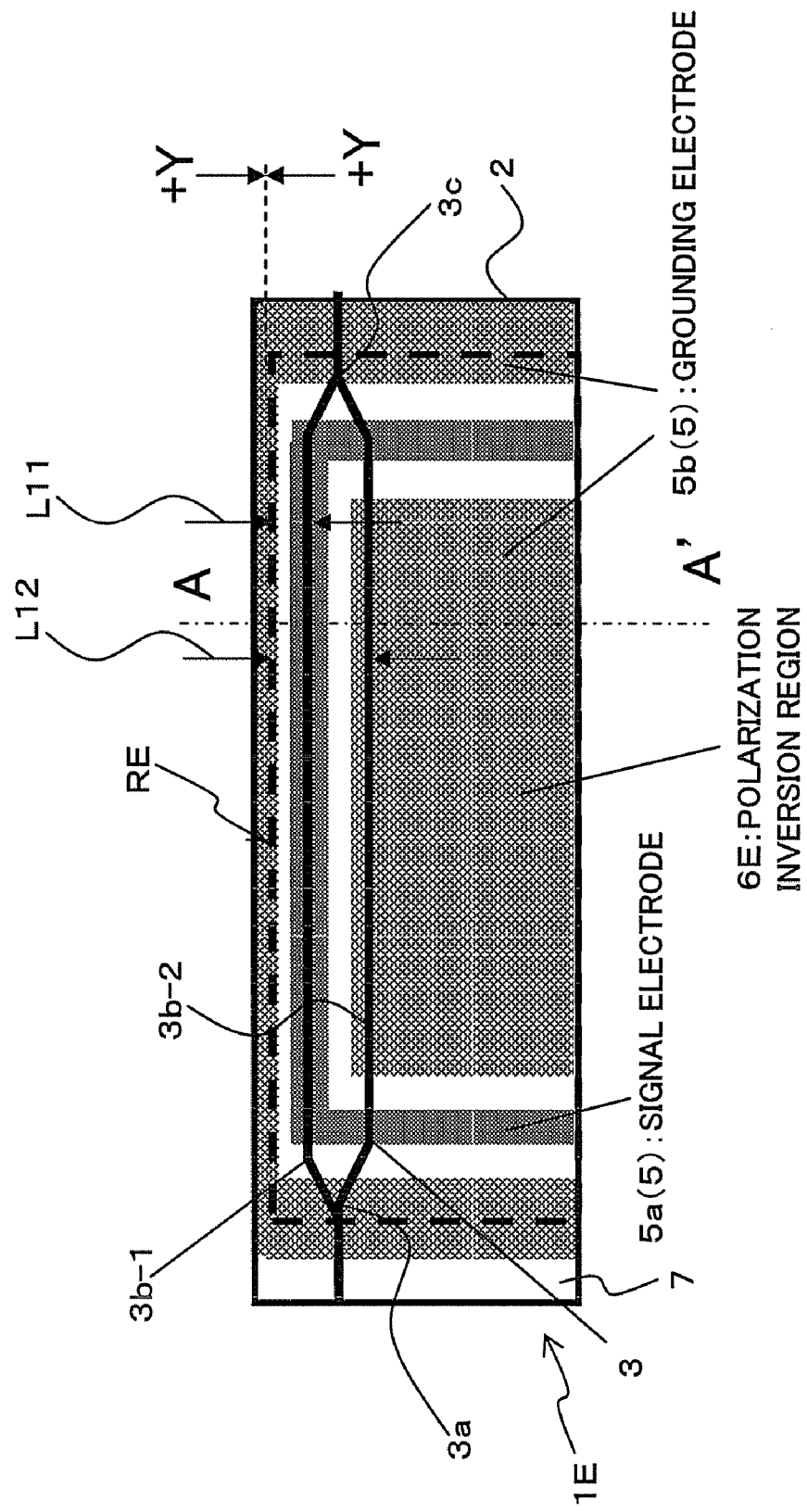
FIG. 17 is a diagram illustrating an optical device according to a fifth modification of the first embodiment of the present invention.
Figure 18A:
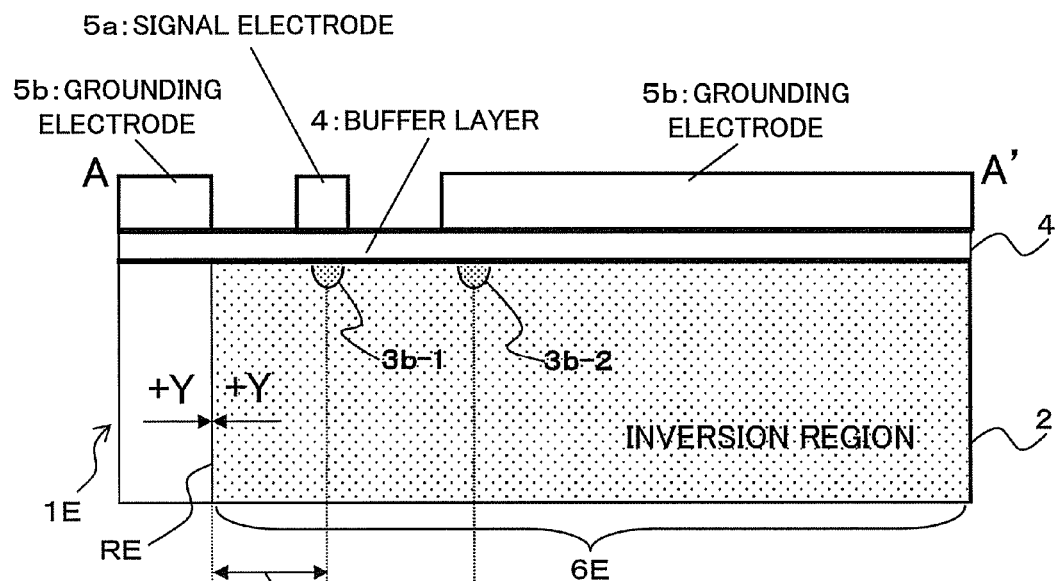
FIG. 18(a) is a sectional view of an optical device illustrated in FIG. 17, and FIG. 18 (b) is a diagram schematically illustrating an example of distortion generated on the section of FIG. 18(a) of a substrate being at a low temperature.

FIG. 17 illustrates an optical device 1E according to a fifth modification of the first embodiment of the present invention, and FIG. 18(a) is a AA' sectional view of the optical device 1E of FIG. 17. The optical device of FIGS. 17 and 18(a) assumes to have the chip distortion in the opposite direction of the chip distortion depicted in FIG. 2(b) on the optical device of FIG. 1. In FIGS. 17 and 18(a), reference numbers identical to those in FIG. 1 represent similar parts and elements to those of FIGS. 1 and 2(b). The optical device 1E illustrated in FIG. 17 includes a polarization inversion region 6E having an interface RE in the vicinity of the branch waveguide 3b-1. Namely, the distance (interface distance) between the interface RE and the branch waveguide 3b-1 is L11 and that between the interface RE and branch waveguide 3b-2 is L12, which is larger than L11, which is larger than the distance L12 between the interface RE and branch waveguide 3b-2. Consequently, only the branch waveguide 3b-1 is affected by the interface lattice distortion from the interface RE.

Figure 18B:
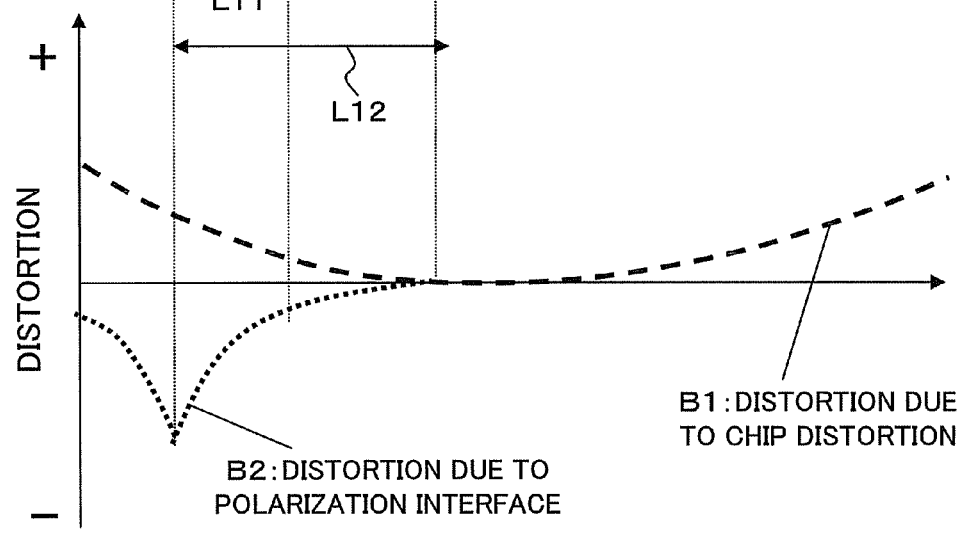

FIG. 18(b) schematically illustrates distortion generated on the section of AA' of the substrate 2 being at a low temperature. In the same drawing, B11 represents the distortion of a chip (the distortion of the substrate 2 itself) being at low temperature, B12 represents the distribution of the interface lattice distortion. As depicted in FIG. 18(b), also in a case where the substrate 2 at low temperature is affected by distortion opposed to that of FIG. 2(b), respective distortions affecting the branch waveguides 3b-1 and 3b-2 can be equalized similarly to the first embodiment by the polarization inversion region 6E having the interface RE in the vicinity of the branch waveguide 3b-1 to keep a constant distance L11 from the branch waveguide 3b-1.

[B] Second Embodiment

Figure 19:
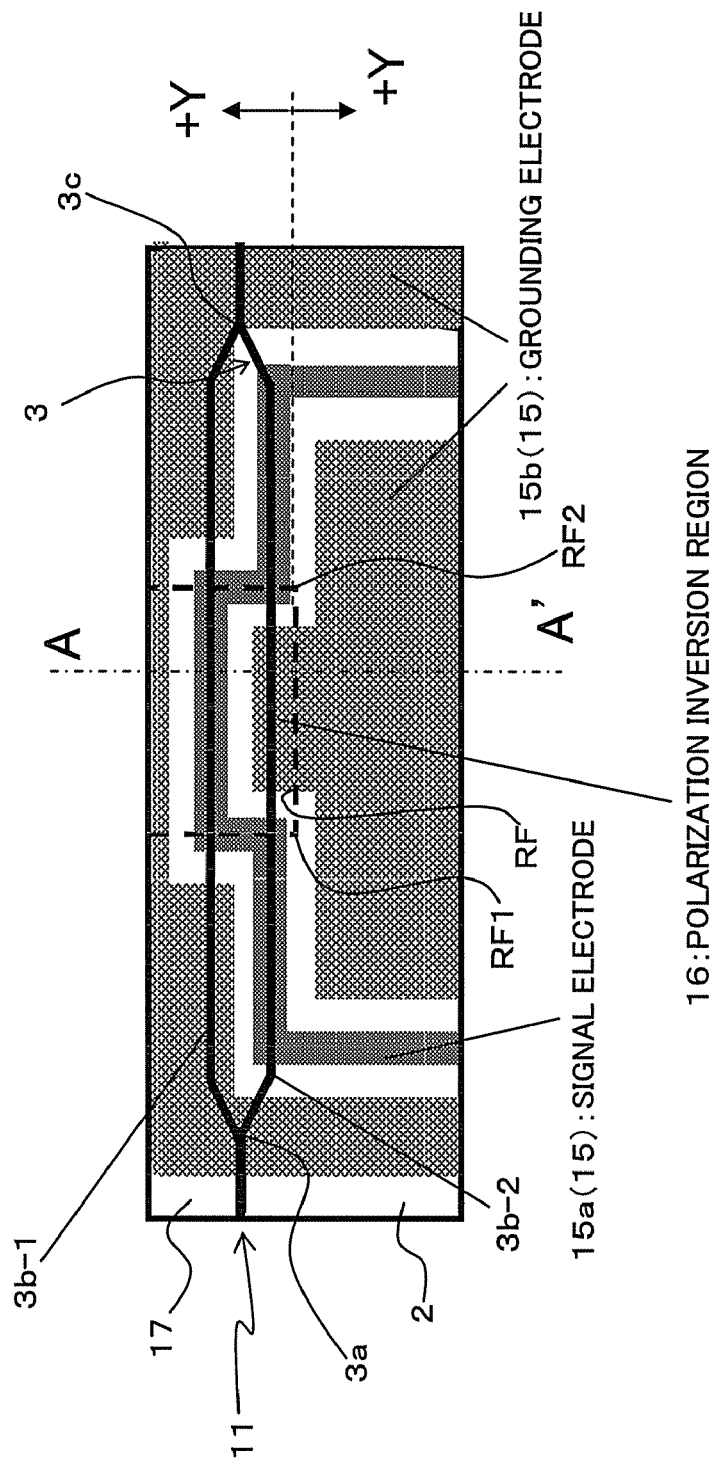
FIG. 19 is a diagram illustrating an optical device according to a second embodiment of the present invention.

FIG. 19 illustrates an optical device 11 according to the second embodiment of the present invention. The optical device 11 illustrated in FIG. 19 includes the same MACH-ZEHNDER optical waveguide 3 as that of the first embodiment formed on the substrate 2, but the configuration of an electrode 15 and the shape of the polarization inversion region 16 are different from those of the first embodiment.

The electrode 15 includes a signal electrode 15a and grounding electrodes 15b which surround the signal electrode 15a, keeping predetermined distances from the signal electrode 15a. Here, the signal electrode 15a is formed so as to connect the upstream portion to the downstream portion on the same side edge of the substrate 2 and is formed over the branch waveguide 3b-2 at the upstream and downstream portions through which the light propagates and over the branch waveguide 3b-1 at the middle portion through which the light propagates.

At the middle portion in which the signal electrode 15a is formed over the branch waveguide 3b-1, the polarization inversion region 16 is formed in region in which two branch waveguides 3b-1 and 3b-2 are formed. Alternatively, the signal electrode 15a may be formed over the branch waveguide 3b-1 serving as the first branch waveguide at the region without the polarization inversion region 16 and over the branch waveguide 3b-2 serving as the second branch waveguide at a region with the polarization inversion region 16.

In driving the optical device 11 of the second embodiment at a high speed so as to function as an optical modulator, a propagating wave electrode is formed by connecting the signal electrode 15a to the terminal of the grounding electrode 15b and a microwave signal is applied to the input end of the propagating wave electrode. The signal application changes the refractive indexes of the branch waveguides 3b-1 and 3b-2 to +Δna and −Δnb, respectively, to change the phase difference between the branch waveguides 3b-1 and 3b-2, which can output the intensity-modulated signal light from the coupling waveguide 3c.

Figure 23:
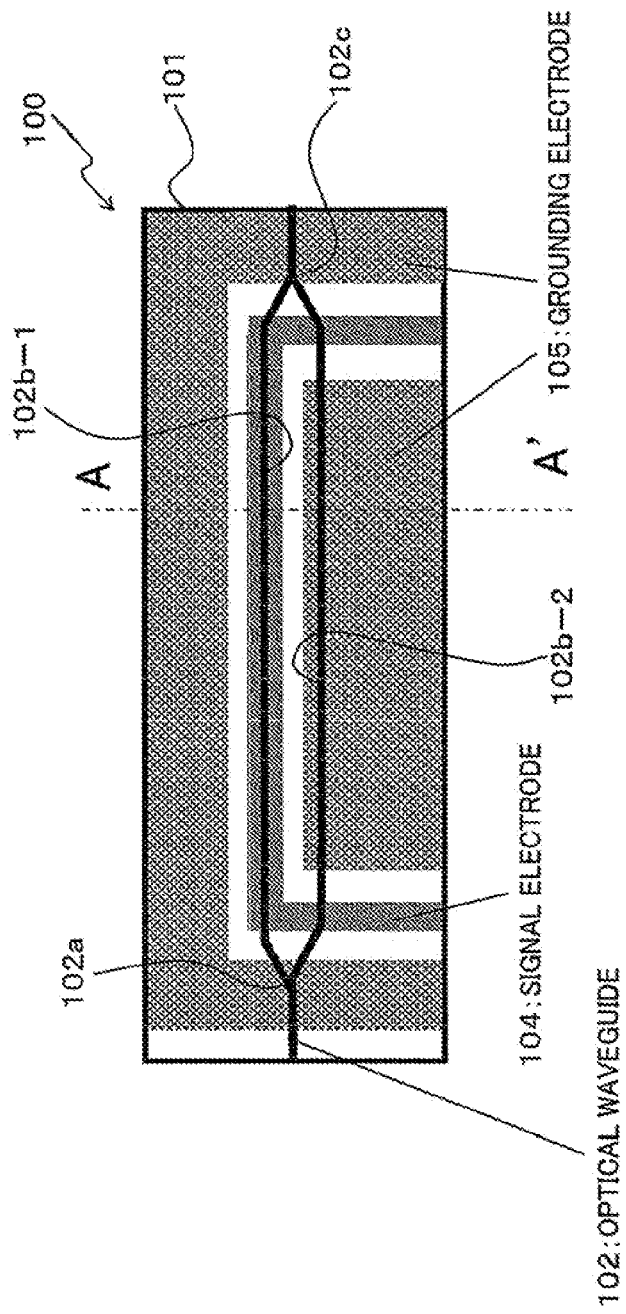
FIG. 23 is a top view schematically illustrating a normal optical device.
Figure 24:
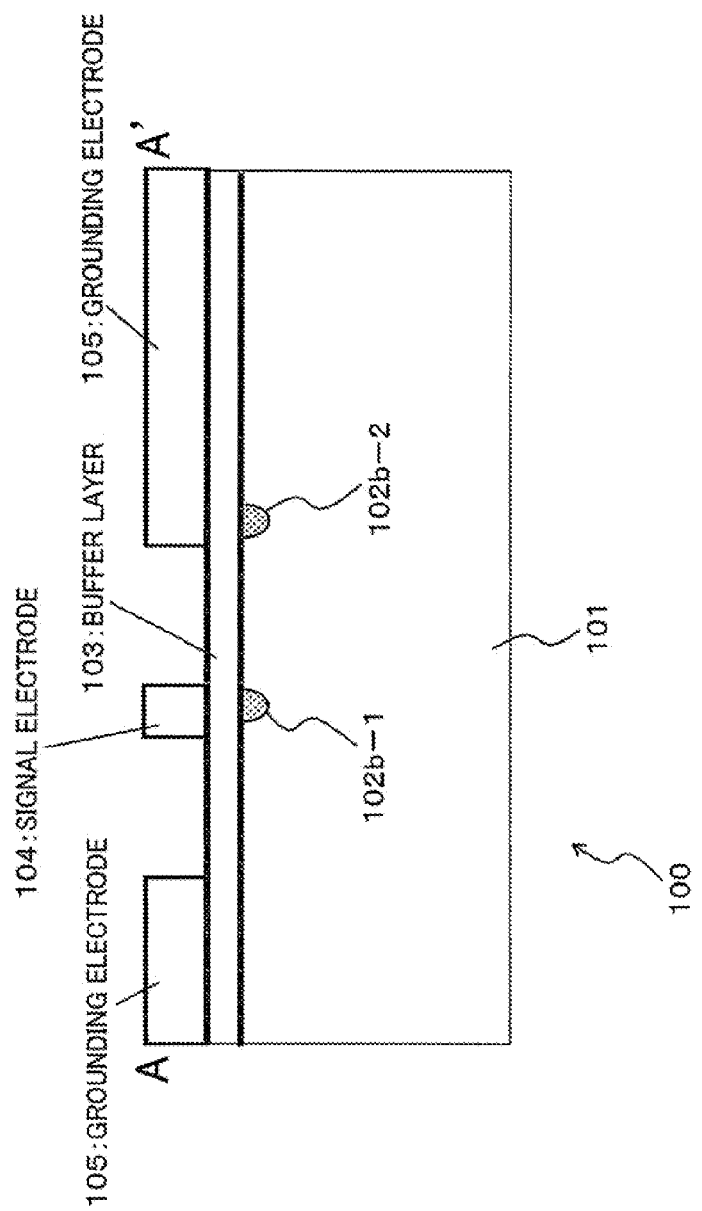
FIG. 24 is a sectional view of an optical device illustrated in FIG. 23.
Figure 25:
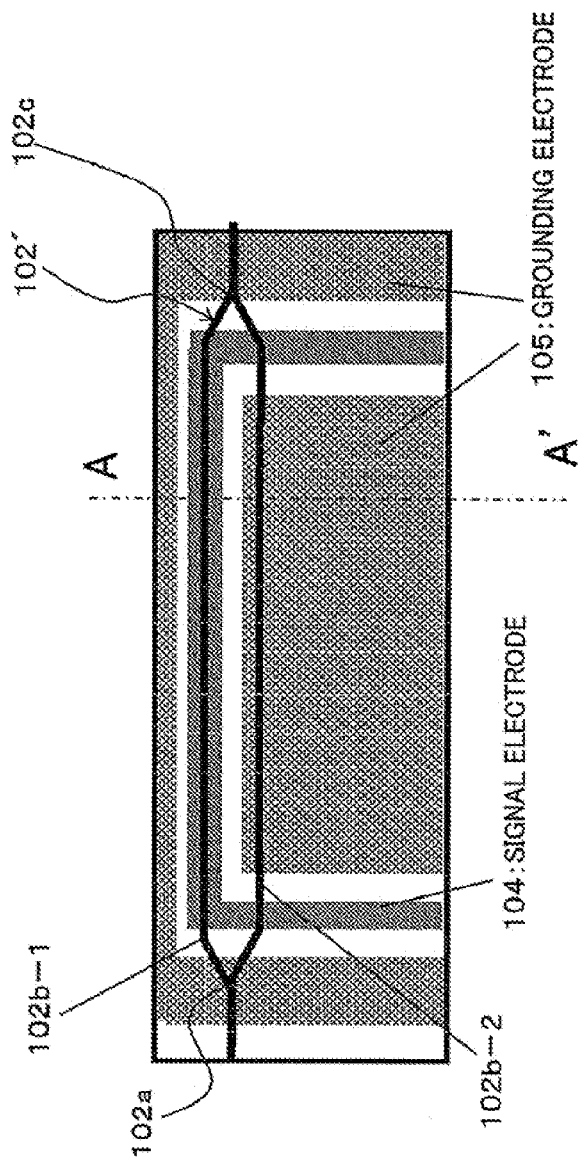
FIG. 25 is a drawing explaining a conventional technique.
Figure 26:
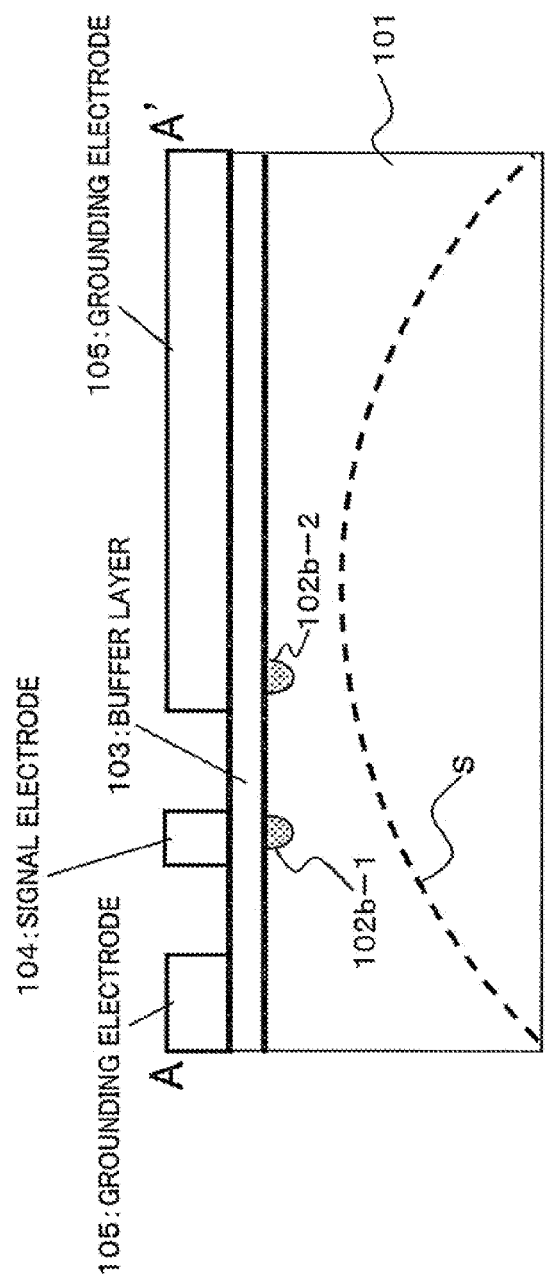
FIG. 26 is a drawing explaining a conventional technique.

Further, a variation in sectional shape of the electrode 15 can control the effective refractive index of the microwave and can thereby match the speed of the light and that of the microwave to obtain light response characteristics covering a broader bandwidth. Here, with the configuration of FIG. 23 in which the polarization inversion region 16 is not formed, application of electric fields having different absolute values to the branch waveguides 3b-1 and 3b-2 results in the relationship Δna<Δnb, which causes a phenomenon (chirping) in which the wavelength of the output light varies at the transition from the on-state to the off-state.

On the other hand, as illustrated in FIG. 19, with the use of the substrate 2 having part of a region 16 in which the polarization is inverted, if a signal electrode 15 formed in the branch waveguide 3b-2 at the region in which the polarization is not inverted and over the branch waveguide 3b-1 over the region 16 in which the polarization is inverted, the absolute values of the electric fields to be applied to the branch waveguides 3b-1 and 3b-2 can be equalized, so that the above wavelength chirping can be inhibited.

In FIG. 19, if the length along which the signal electrode 15 is formed over the branch waveguide 3b-1 is identical to the length (the sum of the upstream portion and the downstream portion) along which the signal electrode 15 is formed over the branch waveguide 3b-2, light components passing through the branch waveguides 3b-1 and 3b-2 undergo the phase shifts of +Δθs and −Δθg at the polarization non-inversion region, respectively and the phase shifts of +Δθg and −Δθs at the polarization inversion region, respectively. Here, the symbols Δθg and Δθs represent amounts of phase shift caused by the grounding electrode 15b and the signal electrode 15a, respectively. Accordingly, light components passing through the branch waveguides 3b-1 and 3b-2 respectively have the phase shifts of +(Δθs+Δθg) and −(Δθs+Δθg) at the coupling waveguide 3c at the output ends of both branch waveguides, so that the phases of the light components are modulated to have the same absolute value and the opposite signs, which can make the wavelength chirping 0. In addition, varying the ratio of the length along which the signal electrode is formed over the branch waveguide 3b-1 and the length along which the signal electrode 15 is formed over the branch waveguide 3b-2 can adjust the amount of chirping.

In the optical device 11 according to the second embodiment, the polarization inversion region 16 includes partial regions of the two branch waveguides 3b-1 and 3b-2 in the light propagation direction, and the interface RF of the polarization inversion region 16 against the remaining region 17 in which the polarization is not inverted includes a linear region RF1-RF2 which is in the vicinity of the branch waveguide 3b-2 of the two branch waveguides 3b-1 and 3b-2, keeping a constant distance from the branch waveguide 3b-2.

In other words, the interface RF serving as the boundary of the polarization inversion region 16, which is formed a partial region (at the middle) of the light propagation direction of the branch waveguides 3b-1 and 3b-2, against the remaining region 17 is in the vicinity of the branch waveguide 3b-2, serving as the second branch waveguide, keeping a constant distance LF2 from the upstream region to the downstream region in the light propagation direction of the branch waveguide 3b-2 while the interface RF has a constant distance LF1, which is larger than LF2, from the branch waveguide 3b-1 serving as the first branch waveguide.

Figure 20A:
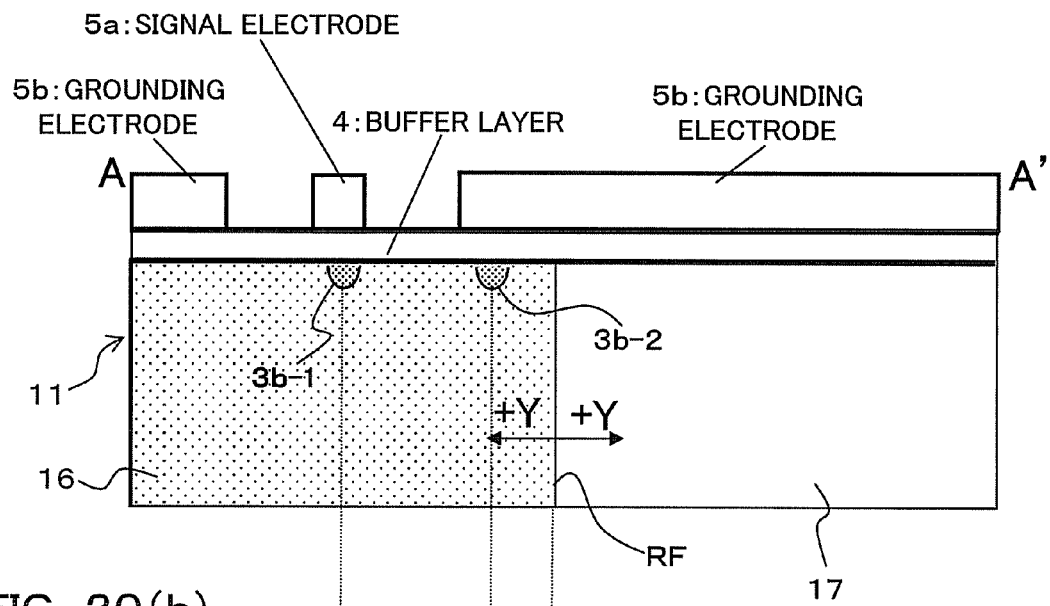
FIG. 20(a) is a sectional view of an optical device illustrated in FIG. 19.
Figure 20B:
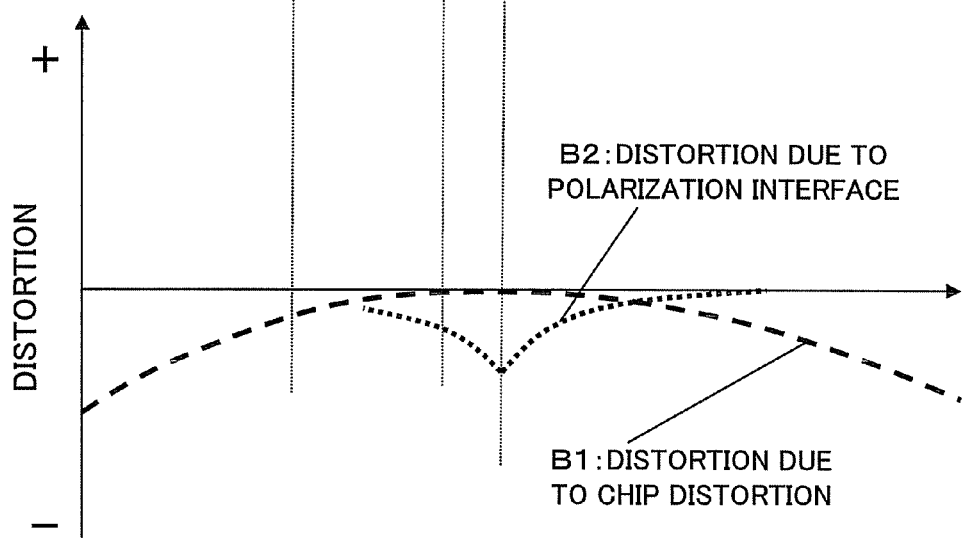
FIG. 20(b) is a diagram schematically illustrating an example of distortion generated on the section of FIG. 20(a) of a substrate being at a low temperature.

FIG. 20(a) is an AA' sectional view of the optical device 11 illustrated in FIG. 19, and FIG. 20(b) schematically depicts distortion appearing at the AA' section on the substrate being at a low temperature point, as an example. B1 in the FIG. 20(b) represents the distribution of the chip distortion (the distortion of the substrate 2 itself) at low temperature, and B2 represents the distortion interface lattice distortion caused by the interface RF.

Also in the optical device 11 having the above configuration, a component of interface lattice distortion can be unevenly provided to the branch waveguides 3b-1 and 3b-2 on which the polarization inversion region 16 is partially formed. In this case, a relatively larger component of interface lattice distortion than the component to be provided to the branch waveguide 3b-1 is provided to the branch waveguide 3b-2 formed inside the width direction of the substrate 2. Therefore, even when the branch waveguide 3b-1 is provided with distortion caused by the chip distortion more largely than the branch waveguide 3b-2, the above interface lattice distortion generated by the polarization inversion region 16 can make the respective sums of distortion provided to the branch waveguides 3b-1 and 3b-2 equalized, so that the operation point drift can be inhibited the same as the first embodiment.

[C] Third Embodiment

Figure 21:
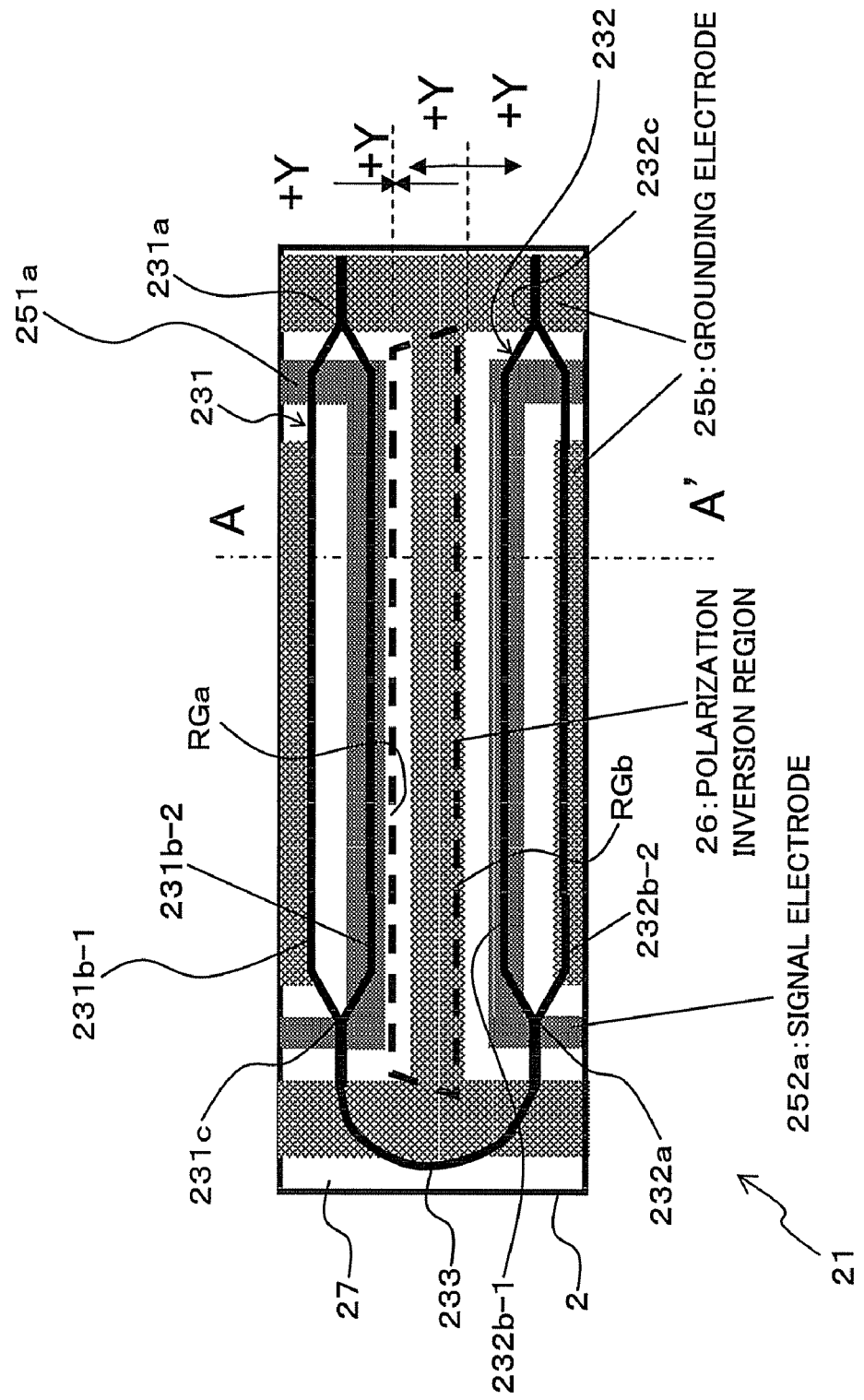
FIG. 21 is a diagram illustrating an optical device according to a third embodiment of the present invention.
Figure 22A:
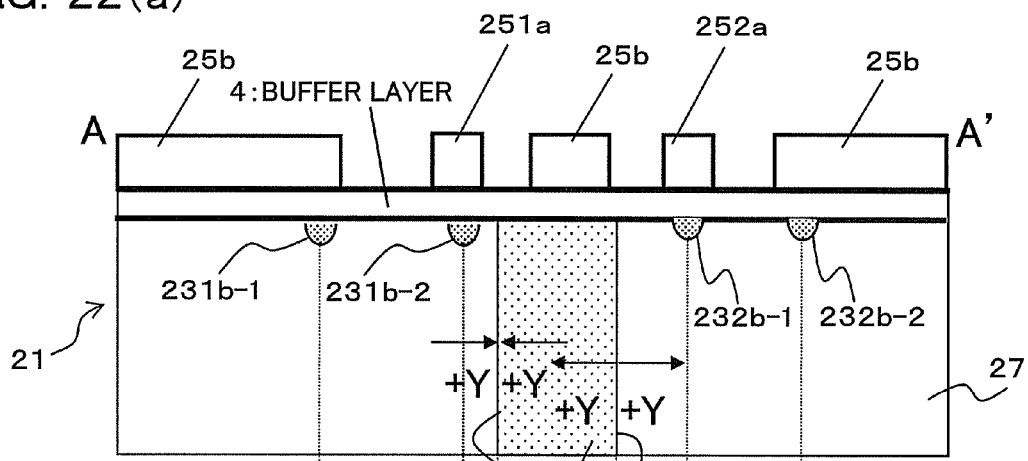
FIG. 22(a) is a sectional view of an optical device illustrated in FIG. 21.

FIG. 21 is a diagram illustrating an optical device 21 according to the third embodiment of the present invention, and FIG. 22(a) is an AA' sectional view of the optical device 21 of FIG. 21. Unlike the above examples, the optical device of FIGS. 21 and 22(a) includes two Mach-Zehnder optical waveguides 231 and 232 which are formed on the substrate 2 and are tandem-connected by a curved waveguide 233. Here, the Mach-Zehnder optical waveguides 231 and 232 include splitting waveguides 231a and 232a, branch waveguides 231b-1, 231b-2, 232b-1, and 232b-2, and coupling waveguides 231c and 232c corresponding to the Mach-Zehnder optical waveguides 3 of the first and the second embodiments. Specifically, the branch waveguide 231b-1, 231b-2, 232b-1, 232b-2 forming the Mach-Zehnder optical waveguides 231 and 232 are arranged in parallel to one another.

The reference number 25 represents an electrode, which is formed above the substrate 2 being interposed by a buffer layer 4, and includes signal electrodes 251a and 252a and a grounding electrodes 25b. The signal electrode 251a is formed over the branch waveguide 231b-2 included in the Mach-Zehnder optical waveguide 231, and the signal electrode 252a is formed over the branch waveguide 232b-1 included in the Mach-Zehnder optical waveguide 232. The grounding electrodes 25b are formed so as to cover the surface of the substrate 2, keeping predetermined distances from the above signal electrodes 231a and 232a. With this configuration, an electric field can be applied to light propagating the Mach-Zehnder optical waveguide 231 through the signal electrode 251a and the grounding electrodes 25b, and also an electric field can be applied to light propagating the Mach-Zehnder optical waveguide 232 through the signal electrode 252a and the grounding electrodes 25b.

In addition, the reference number 26 represents a polarization inversion region, which is formed at an area between the above two Mach-Zehnder optical waveguides 231 and 232 on the substrate 2 to provide interface lattice distortion to the Mach-Zehnder optical waveguide 231 and 232, and includes interfaces RGa and RGb against a remaining region 27 in which the polarization is not inverted.

In the optical device 21 depicted in FIG. 21, even when the branch waveguide 231b-1 and 231b-2 constituting the Mach-Zehnder optical waveguide 231 are affected by uneven chip distortions, the interface lattice distortion caused at the interface RGa closer to the Mach-Zehnder optical waveguide 231 can equalize the distortion components affecting these branch waveguide 231b-1 and 231b-2.

In the same manner, even when the branch waveguide 232b-1 and 232b-2 constituting the Mach-Zehnder optical waveguide 232 are affected by uneven chip distortions, the interface lattice distortion caused at the interface RGb closer to the Mach-Zehnder optical waveguide 232 can equalize the distortion components affecting these branch waveguide 232b-1 and 232b-2.

In the present embodiment, the interface lattice distortion generated at the interface RGb can be small enough not to actually affect the Mach-Zehnder optical waveguide 231 and similarly, the interface lattice distortion generated at the interface RGa can be small enough not to actually affect the Mach-Zehnder optical waveguide 232.

Figure 22B:
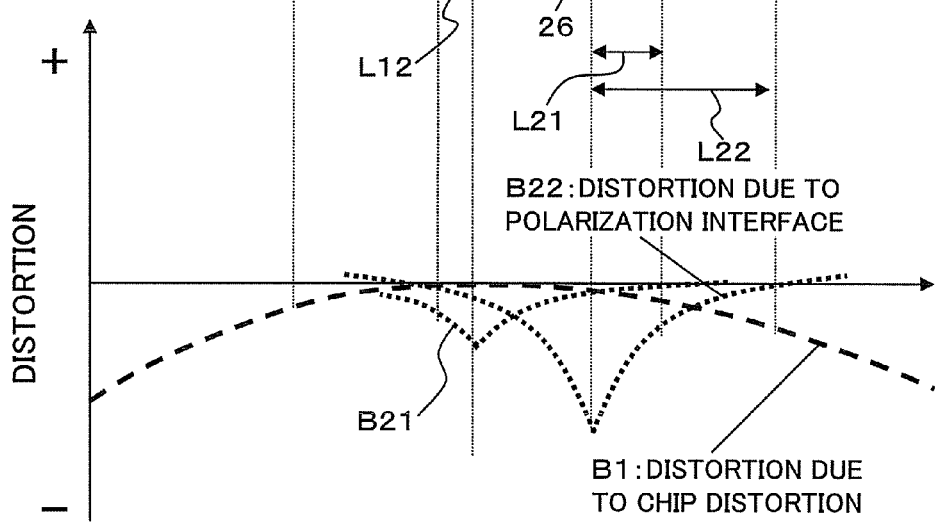
FIG. 22(b) is a diagram schematically illustrating an example of distortion generated on the section of FIG. 22(a) of a substrate being at a low temperature.

FIG. 22(b) schematically illustrates distortion generated on the section AA' of the substrate 2 being at a low temperature, as an example. In the drawing, B1 represents the distribution of the chip distortion (i.e., the distortion of the substrate 2 itself) at low temperature, and B21 and B22 represent the distributions of the interface lattice distortions at the interface RGa and at the interface RGb, respectively.

As depicted in FIG. 22(b), it is possible to equalize the respective amounts of distortion including the distortion B1 of the substrate 2 itself that affects the branch waveguides 231b-1 and 231b-2, and to additionally equalize the respective amount of distortion that affects the branch waveguides 232b-1 and 232b-2.

FIG. 22(b) focuses on the AA' section to depict the distortion distribution, but the branch waveguides 231b-1 and 231b-2 keep substantially constant distances L11 and L12 from the interface RGa. That makes it possible to inhibit an amount of temperature-dependent distortion (or a refractive index deviation) over the entire region from the upstream to the downstream of the branch waveguides 233b-1 and 233b-2 through which light propagates, so that the occurrence of temperature drift can also be inhibited.

Similarly, since the branch waveguides 232b-1 and 232b-2 keep substantially constant distances L21 and L22 from the interface RGa. That makes it possible to inhibit an amount of distortion (or a refractive index deviation) over the entire region from the upstream to the downstream of the branch waveguides 232b-1 and 232b-2 through which light propagates, so that the occurrence of temperature drift can also be inhibited.

In other words, the polarization inversion region 26 includes interfaces RGa and RGb between two Mach-Zehnder optical waveguides 231 and 232 which make respective accumulated amounts of distortion affecting the branch waveguide 231b-1 and 231b-2 over the coordinates in the light propagation direction identical.

Under the configuration in which the Mach-Zehnder optical waveguides 231 and 232 are disposed to be symmetric with respect to the width-direction center of the substrate 2, respective amounts of distortion caused by the chip distortion to affect the branch waveguide 231b-1, 231b-2, 232b-1, and 232b-2 have distributions symmetric with respect to the width-direction center of the substrate 2. When amounts of distortion generated at the interfaces RGa and RGb are the same, the distance L12 between the interface RGa and the branch waveguide 231b-2 can be substantially identical to the distance L21 between the interface RGb and the branch waveguide 232b-1, and the distance L11 between the interface RGa and the branch waveguide 231b-2 can be substantially identical to the distance L22 between the interface RGb and the branch waveguide 232b-2.

As described above, in the third embodiment of the present invention, the single polarization inversion region 26 can inhibit temperature drift at the two Mach-Zehnder optical waveguides 231 and 232 that are tandem connected.

The described third embodiment assumes that the two Mach-Zehnder optical waveguides 231 and 232 are formed over a single chip, i.e., a single substrate 2, but the present invention can similarly reduce the temperature drift of each Mach-Zehnder optical modulator also in a case where a single chip includes more than the two Mach-Zehnder modulators such as an array of a number of Mach-Zehnder modulators integrated on a single chip.

[D] Others

The foregoing embodiments use an LN substrate as the substrate 2, but the present invention is not limited to the usage of an LN substrate. Alternatively, the substrate 2 may be one formed from LiTaO3 or SBN(Sr1-xBaxNb2O6), for example.

The foregoing embodiments assume that the optical device serves as a Mach-Zehnder optical modulator, and the embodiment can be additionally applied to an optical device using a Mach-Zehnder optical waveguide such as an optical switch. Further, the description of the foregoing embodiments is made focusing on the reduction in temperature drift cased by chip distortion. The present invention can similarly reduce temperature drift caused by an electrode stress.

The foregoing embodiments assume that an inverse polarization is formed in the Y axis perpendicular to the branch waveguides 3b-1, 3b-2, 231b-1, 231b-2, 232b-1, and 232b-2 of the X-axis propagation (see FIGS. 4(c) and 4(d)). Alternatively, another combination of the light propagation direction of the waveguide and the direction of polarization inversion may be suggested in the other modes depicted in FIGS. 4(a)-4(b).

Also in the foregoing embodiments, the polarization inversion region and the remaining region in which the polarization is not inverted may be opposite to each other, and this opposite configuration can also inhibit temperature drift similarly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. An optical control device comprising:
a substrate having an electrooptic effect;
a plurality of optical waveguides formed in the substrate in parallel to one another; and
a polarization inversion region which is disposed on a part of the substrate and which has a polarization characteristic that is an inverse to that of the substrate,
wherein a profile of a boundary between the polarization inversion region and a remaining region in which the polarization is not inverted is configured such that the respective waveguides has accumulated amounts of distortion, which comprises a distortion component caused by lattice distortion generated at the boundary in accordance with a variation in temperature to affect the respective waveguides by causing a variation in refractive index and a distortion component caused by a factor other than the lattice distortion, that affects the respective waveguides over coordinates along the light propagation direction which accumulated amounts of distortion are substantially identical to one another.

2. An optical control device according to claim 1, wherein the profile is configured such that the accumulated amounts of distortion that affects the respective waveguides are uniform over coordinates along the light propagation direction.

3. An optical control device according to claim 1, wherein the profile is configured such that the accumulated amounts of distortion that affects the respective waveguides have variation distributions with different patterns over coordinates along the light propagation pattern.

4. An optical control device according to claim 1, wherein:
the plurality of waveguides are disposed so as to unevenly receive distortion caused on the substrate in accordance with the variation in temperature: and
the boundary of the polarization inversion area is configured so as to induce respective different variations in refractive indexes of the plurality of waveguides.

5. An optical control device according to claim 1,
further comprising a splitting waveguide which splits input light into a number of light components which propagates the respective waveguides and a coupling waveguide which couples the light components propagated through the respective waveguides is formed in the substrate, wherein:
the plurality of waveguides, the splitting waveguide, and the coupling waveguide constitute the Mach-Zehnder optical waveguide.

6. An optical control device according to claim 5, further comprising an electrode formed in the substrate to cause the light components propagating through the waveguides to have differences in refractive index.

7. An optical control device according to claim 5, wherein the polarization inversion region accommodates a region in which the Mach-Zehnder optical waveguide is formed and comprises a linear region, serving as the boundary, which has constant distances from both outermost waveguides disposed in parallel.

8. An optical control device according to claim 5, wherein the polarization inversion region deviates from a region in which the Mach-Zehnder optical waveguide is formed, and the polarization inversion region includes that a linear region serves as the boundary and has a constant distance to one of outermost waveguides.

9. An optical control device according to claim 5, wherein:
the waveguides comprise two waveguides of a first waveguide and a second waveguide;
the polarization inversion region is disposed in a region between the two waveguides and comprises, as the boundary, a first linear region and a second linear region respectively adjacent to the first waveguide and the second waveguide along the light propagation direction;
the first linear region has an uneven distance from the first waveguide which distance varies along the light propagation region from an upstream region to a downstream region; and
the second linear region has a constant distance from the second waveguide along the light propagation region from the upstream region to the downstream region.

10. An optical control device according to claim 5, wherein:
the waveguides comprise two waveguides of a first waveguide and a second waveguide;
the polarization inversion region is disposed in a region between the two waveguides and includes, as the boundary, a first linear region and a second linear region respectively adjacent to the first waveguide and the second waveguide along the light propagation direction from an upstream region to a downstream region respectively at a constant first distance and a second constant second distance; and
the first distance and the second distance are determined such that accumulated amounts of distortion that affects the respective the first and the second waveguides over coordinates along the light propagation direction are substantially identical.

11. An optical control device according to claim 5, wherein the waveguides are configured to be ridge waveguides.

12. An optical control device according to claim 5, wherein:
the waveguides comprise two waveguides of a first waveguide and a second waveguide; and
the polarization inversion region includes parts of the light propagation direction of the two waveguides, and comprises, as the boundary, a linear region in the vicinity of and at a constant distance from one of the first and the second waveguides.

13. An optical control device according to claim 12, further comprising a signal electrode and a grounding electrode that cause the light components propagating through the two parallel waveguides to have a difference of refractive index when an electric field is applied,
wherein the signal electrode is disposed over the first waveguide in a region in which the polarization inversion region is not formed and is disposed over the second waveguide in a region in which the polarization inversion region is formed.

14. An optical control device according to claim 5, further comprising two of the Mach-Zehnder optical waveguides which are formed in the substrate and which are tandem connected to each other by a curved waveguide that returns the optical propagation direction,
wherein the waveguides of each of the Mach-Zehnder optical waveguide are parallel one another
the polarization inversion region includes a boundary which is disposed between the two Mach-Zehnder waveguides and which causes accumulated amounts of distortion affecting respective waveguides of each of the waveguides over coordinates along the light propagation direction are substantially identical.

15. An optical control device according to claim 1, wherein the substrate is made of lithium niobate.

16. An optical control device according to claim 1, wherein the optical waveguides are formed along the X axis or the Y axis of crystal.

17. An optical control device according to claim 1, wherein the distortion component caused by the factor other than the lattice distortion is distortion caused by warp of the substrate in accordance with a variation in temperature.

18. An optical control device according to claim 1, further comprising an electrode formed over the substrate, being interposed by a buffer layer, to cause the light components propagating through the waveguides to have differences in refractive index,
wherein the distortion component caused by the factor other than the lattice distortion is distortion caused by a stress caused by a difference of thermal expansion coefficients between the buffer layer and the electrode which difference is caused by a variation in temperature.

19. An optical control device according to claim 1, wherein the polarization inversion region is disposed at a region in which the plurality of optical waveguides is not disposed.

* * * * *